(12) United States Patent
Gotou et al.

(10) Patent No.: US 10,190,007 B2
(45) Date of Patent: Jan. 29, 2019

(54) INK, INK CONTAINER, IMAGE FORMING METHOD, IMAGE FORMING APPARATUS, AND IMAGE FORMED MATTER

(71) Applicants: Hiroshi Gotou, Shizuoka (JP); Masahiko Ishikawa, Shizuoka (JP)

(72) Inventors: Hiroshi Gotou, Shizuoka (JP); Masahiko Ishikawa, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 101 days.

(21) Appl. No.: 15/149,440

(22) Filed: May 9, 2016

(65) Prior Publication Data
US 2016/0333208 A1 Nov. 17, 2016

(30) Foreign Application Priority Data

May 14, 2015 (JP) .................. 2015-099186
Oct. 21, 2015 (JP) .................. 2015-207446

(51) Int. Cl.
C09D 11/322 (2014.01)
C09D 11/38 (2014.01)

(52) U.S. Cl.
CPC ............ C09D 11/322 (2013.01); C09D 11/38 (2013.01)

(58) Field of Classification Search
None
See application file for complete search history.

(56) References Cited

U.S. PATENT DOCUMENTS

| 8,814,340 | B2 * | 8/2014 | Goto | .................... | B41M 5/0017 347/100 |
| 8,980,408 | B2 | 3/2015 | Gotou et al. | | |
| 8,998,400 | B2 | 4/2015 | Harada et al. | | |
| 9,033,484 | B2 | 5/2015 | Fujii et al. | | |
| 9,062,217 | B2 * | 6/2015 | Gotou | .................. | B41M 5/0017 |
| 9,169,416 | B2 * | 10/2015 | Gotou | .................. | B41M 5/0017 |
| 2003/0158291 | A1 * | 8/2003 | Nakamura | ............. | C09D 11/30 523/160 |
| 2011/0318543 | A1 * | 12/2011 | Goto | .................... | B41M 5/0017 428/195.1 |

(Continued)

FOREIGN PATENT DOCUMENTS

EP 2 960 308 12/2015
JP 2010-168433 A 8/2010

(Continued)

OTHER PUBLICATIONS

Extended European Search Report dated Jul. 20, 2016 in Patent Application No. 16169694.3.

*Primary Examiner* — Peter A Salamon
(74) *Attorney, Agent, or Firm* — Oblon, McClelland, Maier & Neustadt, L.L.P.

(57) ABSTRACT

Provided is an ink containing a colorant, an organic solvent, and water, wherein the ink contains as the organic solvent, at least one kind of an organic solvent having a solubility parameter of greater than or equal to 9 but less than 11.8, wherein a content of the organic solvent having a solubility parameter of greater than or equal to 9 but less than 11.8 is greater than or equal to 20% by mass of a total amount of the ink, wherein a dynamic surface tension A of the ink at 25° C. at a surface lifetime, measured by a maximum foaming pressure method, of 15 msec is less than or equal to 34.0 mN/m, and wherein the dynamic surface tension A and a static surface tension B of the ink at 25° C. satisfy a formula of $10.0\% \leq [(A-B)/(A+B)] \times 100 \leq 19.0\%$.

20 Claims, 4 Drawing Sheets

(56) References Cited

U.S. PATENT DOCUMENTS

| | | | |
|---|---|---|---|
| 2012/0207983 A1* | 8/2012 | Matsuyama | C09D 11/328 428/195.1 |
| 2013/0115431 A1* | 5/2013 | Aoyama | C09D 11/322 428/195.1 |
| 2013/0155145 A1* | 6/2013 | Gotou | C09D 11/322 347/21 |
| 2013/0323474 A1* | 12/2013 | Gotou | C09D 11/36 428/195.1 |
| 2014/0002539 A1* | 1/2014 | Goto | C09D 11/322 347/20 |
| 2014/0368572 A1* | 12/2014 | Goto | C09D 11/322 347/20 |
| 2015/0035896 A1* | 2/2015 | Gotou | B41J 11/0015 347/20 |
| 2015/0079358 A1* | 3/2015 | Gotou | C09D 11/324 428/195.1 |
| 2015/0103116 A1* | 4/2015 | Gotou | B41J 11/002 347/21 |
| 2015/0283828 A1* | 10/2015 | Aoai | B41M 5/0017 428/207 |
| 2015/0368492 A1 | 12/2015 | Fujii et al. | |
| 2016/0333208 A1* | 11/2016 | Gotou | C09D 11/38 |

FOREIGN PATENT DOCUMENTS

| | | |
|---|---|---|
| JP | 2012-111845 | 6/2012 |
| JP | 2012-207202 | 10/2012 |
| JP | 2013-010823 | 1/2013 |
| JP | 2013-035993 | 2/2013 |
| JP | 2013-100395 | 5/2013 |
| JP | 2013-107952 | 6/2013 |
| JP | 2014-043493 | 3/2014 |
| JP | 2014-094998 | 5/2014 |
| JP | 2014-224248 | 12/2014 |

\* cited by examiner ively proposed inkjet recording inks containing water, a water-soluble organic solvent, a surfactant, and a colorant (see, e.g., Japanese Unexamined Patent Application Publication Nos. 2012-207202 and 2014-94998). A polyvalent alcohol, a predetermined amide compound, etc. that have an equilibrium water content of greater than or equal to 30% at a temperature of 23° C. and a relative humidity of 80% are used as the water-soluble organic solvent. At least one selected from the group consisting of silicone-based surfactants, fluorosurfactants, and acetyleneglycol-based surfactants is used as the surfactant.

INK, INK CONTAINER, IMAGE FORMING METHOD, IMAGE FORMING APPARATUS, AND IMAGE FORMED MATTER

CROSS-REFERENCE TO RELATED APPLICATIONS

The present application claims priority under 35 U.S.C. § 119 to Japanese Patent Application No. 2015-099186, filed May 14, 2015, and Japanese Patent Application No. 2015-207446, filed Oct. 21, 2015. The contents of which are incorporated herein by reference in their entirety.

BACKGROUND OF THE INVENTION

Field of the Invention

The present disclosure relates to inks, ink containers, image forming methods, image forming apparatuses, and image formed matters.

Description of the Related Art

In recent years, image forming methods have been spreading rapidly, for the reasons that image forming methods enable easy recording of color images and running costs of image forming methods are low.

Water-based pigment inks obtained by dispersing a pigment in water in a state of particles are paid attention as inks to be used in the image forming methods. Pigments have close compositions to colorants used in common commercial printing inks and are hence expected to be able to provide printed matters with close tones to commercially printed matters. However, when the water-based pigment inks are recorded over coat paper for commercial printing or publication printing, there occurs a lag in ink absorption, leading to a problem of beading.

Hence, the present applicant has previously proposed inkjet recording inks containing water, a water-soluble organic solvent, a surfactant, and a colorant (see, e.g., Japanese Unexamined Patent Application Publication Nos. 2012-207202 and 2014-94998). A polyvalent alcohol, a predetermined amide compound, etc. that have an equilibrium water content of greater than or equal to 30% at a temperature of 23° C. and a relative humidity of 80% are used as the water-soluble organic solvent. At least one selected from the group consisting of silicone-based surfactants, fluorosurfactants, and acetyleneglycol-based surfactants is used as the surfactant.

However, these proposals have not achieved optimization in a relationship between a dynamic surface tension of the inks at a surface lifetime, measured by a maximum foaming pressure method, of 15 msec and a static surface tension of the inks. Therefore, there is a problem that the inks are wettable over an ink-repellent film over a nozzle plate of an ink head and adhere to the nozzles to degrade discharging stability.

SUMMARY OF THE INVENTION

An ink of the present invention as a solution to the problems described above is an ink containing a colorant, an organic solvent, and water. The ink contains as the organic solvent, at least one kind of an organic solvent having a solubility parameter of greater than or equal to 9 but less than 11.8. A content of the organic solvent having a solubility parameter of greater than or equal to 9 but less than 11.8 is greater than or equal to 20% by mass of a total amount of the ink. A dynamic surface tension A of the ink at 25° C. at a surface lifetime, measured by a maximum foaming pressure method, of 15 msec is less than or equal to 34.0 mN/m. The dynamic surface tension A and a static surface tension B of the ink at 25° C. satisfy a formula of $10.0\% \leq [(A-B)/(A+B)] \times 100 \leq 19.0\%$.

DESCRIPTION OF THE EMBODIMENTS

Figure 1:
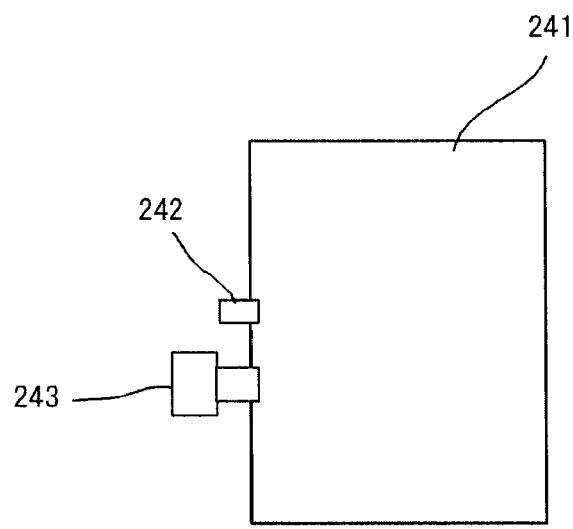
FIG. 1 is a schematic view illustrating an example of an ink container of the present invention.

The present invention has an object to provide an ink that can be recorded over plain paper and general-purpose printing paper with a high quality suppressed in beading and has a favorable image density and a favorable discharging stability.

The present invention can provide an ideal ink that can be recorded over plain paper and general-purpose printing paper with a favorable quality suppressed in beading and has a favorable image density and a favorable discharging stability.

(Ink)

An ink of the present invention contains a colorant, an organic solvent, and water, preferably contains a surfactant and a water-dispersible resin, and further contains other components as needed.

The ink contains as the organic solvent, at least one kind of an organic solvent having a solubility parameter of greater than or equal to 9 but less than 11.8. A content of the organic solvent having a solubility parameter of greater than or equal to 9 but less than 11.8 is greater than or equal to 20% by mass of a total amount of the ink. A dynamic surface tension A of the ink at 25° C. at a surface lifetime, measured by a maximum foaming pressure method, of 15 msec is less than or equal to 34.0 mN/m. The dynamic surface tension A and a static surface tension B of the ink at 25° C. satisfy a formula of $10.0\% \leq [(A-B)/(A+B)] \times 100 \leq 19.0\%$. These conditions ensure the ink a sufficient wettability over recording media, enable the ink to smoothly permeate even coat paper having a coating layer and hence a poor ink absorbability, such as general-purpose printing paper, and enable the ink to be thickened in viscosity through rapid aggregation of the pigment in a drying process after landing of the ink onto the paper surface to be suppressed from causing beading.

The dynamic surface tension A of the ink at 25° C. at a surface lifetime, measured by a maximum foaming pressure method, of 15 msec is less than or equal to 34.0 mN/m, preferably less than or equal to 30.0 mN/m, and more preferably greater than or equal to 25.0 mN/m but less than or equal to 30.0 mN/m.

The dynamic surface tension A of less than or equal to 34.0 mN/m realizes a favorable wettability and a favorable permeability to general-purpose printing paper, is highly effective for suppressing beading and color bleeding, and also brings improvements over plain paper in a chromogenic property and suppression of white spots.

The dynamic surface tension of the ink at a surface lifetime, measured by a maximum foaming pressure method, of 15 msec can be measured with, for example, SITA DYNOTESTER (available from SITA Messtechnik GmbH) at 25° C.

It is preferable that the dynamic surface tension A and the static surface tension B of the ink at 25° C. satisfy a formula of $10.0\% \leq [(A-B)/(A+B)] \times 100 \leq 19.0\%$ and a formula of $12.0\% \leq [(A-B)/(A+B)] \times 100 \leq 17.0\%$.

When the dynamic surface tension A and the static surface tension B of the ink at 25° C. satisfy the formula of $10.0\% \leq [(A-B)/(A+B)] \times 100 \leq 19.0\%$, the ink has an optimum balance between the dynamic surface tension A and the static surface tension B, is hardly wettable over a water-repellent film over a nozzle plate of an inkjet head, and is very stable with discharging stability and without nozzle clogging in continuous discharging.

Because the ink contains at least one kind of an organic solvent having a predetermined solubility parameter value in a content greater than or equal to a predetermined amount and has a relationship satisfying a predetermined range between the dynamic surface tension A and the static surface tension B as described above, the pigment is fixed uniformly about a paper surface after dried. This makes it possible to obtain a highly chromogenic image suppressed in beading and color bleeding and achieve a high gamut cover rate.

The static surface tension B of the ink at 25° C. is preferably greater than or equal to 20.0 mN/m but less than or equal to 30.0 mN/m.

The static surface tension of greater than or equal to 20.0 mN/m but less than or equal to 30.0 mN/m can impart a high permeability to the ink, provides a high effect of reducing cockling and curling, and makes the ink favorably permeable and dryable when printed over plain paper.

The static surface tension of the ink can be measured with, for example, a fully automated surface tensiometer (CBVP-Z available from Kyowa Interface Science Co., Ltd.) at 25° C.

A gamut cover rate reproduced by the ink is a value indicating what percentage of a color gamut volume of a target color is covered by (enclosed within) a color gamut volume of an evaluated color. Specifically, for each of the evaluated color and the target color, eight plot points of C, M, Y, R, G, B, Bk, and W in a L*a*b* color space are linked together by straight lines and projected on an a*b* plane at each luminosity level L*. Next, six points projected on the a*b* plane at each luminosity level L*, namely C, M, Y, R, G, and B are linked together by straight lines as a color gamut area. An area of a region over which the color gamut area of the evaluated color and the color gamut area of the target color overlap with each other is integrated in the luminosity direction (as an enclosed volume). A ratio of the obtained value of integral to the color gamut volume of the target color (i.e., enclosed volume/color gamut volume of the target color) is evaluated as the gamut cover rate.

The target color used is a color reproduction area in the L*a*b* color space defined in 'Japan Color 2011 for Sheet-fed Offset based on ISO' (abbreviated as: Japan Color 2011 coat paper)'.

The L*a*b* color space can be measured with, for example, a spectrodensitometer (X-RITE 939 available from X-Rite Inc.) with a D50 light source, without a filter, and at a viewing angle of 2°.

Hence, in the present invention, it is preferable that the colorant be any one selected from the group consisting of carbon black pigments, phthalocyanine pigments, quinacridone pigments, monoazo pigments, and disazo pigments, and that the gamut cover rate reproduced by the ink be greater than or equal to 90% of a gamut cover rate defined in Japan Color 2011 coat paper.

When the gamut cover rate reproduced by the ink is greater than or equal to 90%, a highly chromogenic image that is in no way inferior to offset printing can be obtained.

<Organic Solvent>

The ink contains as the organic solvent, at least one kind of an organic solvent having a solubility parameter of greater than or equal to 9 but less than 11.8. Addition of the organic solvent having a solubility parameter of greater than or equal to 9 but less than 11.8 makes it possible to suppress occurrence of beading even over general-purpose printing paper.

The solubility parameter (SP value) is a quantification of how easy it is for substances to dissolve with each other. The SP value is represented by a square root of a cohesive energy density (CED), which is a force by which molecules of the substances attract each other. The CED refers to an amount of energy needed to evaporate 1 mL of the substances.

The solubility parameter (SP value) is defined based on the regular solution theory introduced by Hildebrand and functions as an indicator of solubility of a binary solution.

There are some theories about how to calculate the SP value. The present invention employs a Fedors method commonly used.

A SP value can be calculated using a formula (B) below according to the Fedors method.

$$\text{SP value (solubility parameter)} = (\text{CED value})^{1/2} = (E/V)^{1/2} \quad \text{formula (B)}$$

In the formula (B) above, E represents a molecular cohesive energy (cal/mol) and V represents a molecular volume (cm³/mol). E and V are represented by formulae (C) and (D) below, where $\Delta ei$ represents an evaporation energy of a group of atoms and $\Delta vi$ represents a molar volume of the group of atoms.

$$E = \Sigma \Delta ei \quad \text{formula (C)}$$

$$V = \Sigma \Delta vi \quad \text{formula (D)}$$

Data described in Imoto, Minoru. *SECCHAKU NO KISO RIRON*, Kobunshi Kankokai, chapter 5 can be used as the data of the evaporation energy $\Delta ei$ and molar volume $\Delta vi$ of each group of atoms in the calculation method described above.

Fedors, R. F. *Polym. Eng. Sci.* 14,147, 1974 can be referred to for any matters such as —$CF_3$, data of which are not presented.

The organic solvent having a solubility parameter (SP value) of greater than or equal to 9 but less than 11.8 is more preferably at least one kind selected from the group consisting of amide compounds represented by a general formula (I) below and oxetane compounds represented by a general formula (II) below.

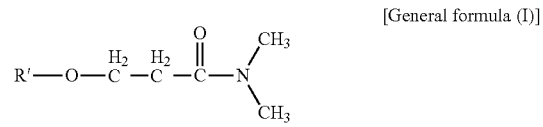

[General formula (I)]

In the general formula (I) above, R' represents an alkyl group containing 4 through 6 carbon atoms.

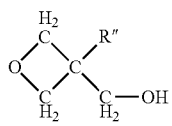
[General formula (II)]

In the general formula (II) above, R″ represents an alkyl group containing 1 or 2 carbon atoms.

Specific example compounds of the amide compounds represented by the general formula (I) above and of the oxetane compounds represented by the general formula (II) above include the following compounds.

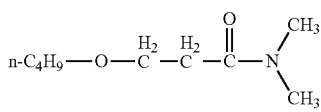
[Structural formula (1), SP value: 9.03]

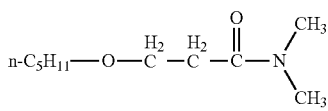
[Structural formula (2), SP value: 9.00]

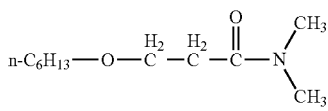
[Structural formula (3), SP value: 8.96]

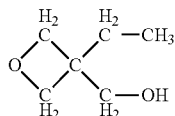
[Structural formula (4), SP value: 11.3]

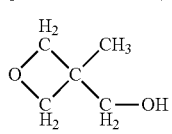
[Structural formula (5), SP value: 11.79]

As the organic solvent, it is preferable to use a polyvalent alcohol having a solubility parameter (SP value) of greater than or equal to 11.8 but less than or equal to 14.0 and a permeating agent having a solubility parameter (SP value) of greater than or equal to 9 but less than 11.8 in addition to any amide compound represented by the general formula (I) and any oxetane compound represented by the general formula (II).

Examples of the polyvalent alcohol having a solubility parameter (SP value) of greater than or equal to 11.8 but less than or equal to 14.0 include 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), 1,3-propanediol (SP value: 13.72), 1,2-hexanediol (SP value 11.8), 1,6-hexanediol (SP value: 11.95), 3-methyl-1,5-pentanediol (SP value: 11.8), triethylene glycol (SP value: 12.12), and diethylene glycol (SP value: 13.02). One of these polyvalent alcohols may be used alone or two or more of these polyvalent alcohols may be used in combination.

Among these polyvalent alcohols, 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), and 1,3-propanediol (SP value: 13.72) are preferable, and 1,2-btanediol (SP value: 12.8) and 1,2-propanediol (SP value: 13.5) are more preferable.

A total content of the polyvalent alcohol having a solubility parameter (SP value) of greater than or equal to 11.8 but less than or equal to 14.0, the amide compound represented by the general formula (I), and the oxetane compound represented by the general formula (II) is preferably greater than or equal to 30% by mass but less than or equal to 60% by mass of the total amount of the ink.

When the content is greater than or equal to 30% by mass, it may be possible to suppress beading and inter-color bleeding over general-purpose printing paper. When the content is less than or equal to 60% by mass, image qualities are favorable and the ink has an adequate viscosity and a favorable discharging stability.

The permeating agent preferably has a solubility parameter of greater than or equal to 9 but less than 11.8. Examples of the permeating agent include polyol compounds containing 8 through 11 carbon atoms and glycolether compounds containing 8 through 11 carbon atoms.

Among these compounds, 1,3-diol compounds represented by a general formula (VII) below are preferable, and 2-ethyl-1,3-hexanediol [SP value: 10.6] and 2,2,4-trimethyl-1,3-pentanediol [SP value: 10.8] are particularly preferable.

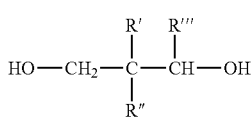
[General formula (VII)]

In the general formula (VII) above, R′ represents a methyl group or an ethyl group, R″ represents a hydrogen atom or a methyl group, and R‴ represents an ethyl group or a propyl group.

Other examples of the polyol compounds include 2-ethyl-2-methyl-1,3-propanediol, 3,3-diemthyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

A content of the permeating agent is preferably greater than or equal to 0.5% by mass but less than or equal to 4% by mass and more preferably greater than or equal to 1% by mass but less than or equal to 3% by mass of the total amount of the ink. When the content is greater than or equal to 0.5% by mass, the ink can obtain a permeating effect and provide an effect in image qualities. On the other hand, when the content is less than or equal to 4% by mass, the ink has an adequate initial viscosity.

The content of the organic solvent having a solubility parameter of greater than or equal to 9 but less than 11.8 is greater than or equal to 20% by mass and preferably greater than or equal to 20% by mass but less than or equal to 60% by mass of the total amount of the ink.

When the content is greater than or equal to 20% by mass, occurrence of beading over general-purpose printing paper can be suppressed, and an effect of suppressing color bleeding between colors is improved. On the other hand, when the content is less than or equal to 60% by mass, image qualities are improved, and the ink has an adequate viscosity and an improved discharging stability.

It is preferable that the ink not contain "a polyvalent alcohol having an equilibrium water content of greater than or equal to 30% at a temperature of 23° C. and a relative humidity of 80%" as the organic solvent.

To obtain the equilibrium water content, a dessicator in which a potassium chloride/sodium chloride saturated aqueous solution is used is maintained at a temperature of 23° C.±1° C. and a relative humidity of 80%±3%, and a petri dish in which an organic solvent is weighed out in 1 g is stored in the dessicator. The equilibrium water content is calculated according to a formula below.

Equilibrium water content (%)=[water content absorbed in organic solvent/(organic solvent+ water content absorbed in organic solvent)]×100

When the ink contains "a polyvalent alcohol having an equilibrium water content of greater than or equal to 30% at a temperature of 23° C. and a relative humidity of 80%" as the organic solvent, the ink may lag in permeation into coat paper having a coating layer and a poor ink absorbability, such as general-purpose printing paper, and lag in drying after landing on the paper surface to cause beading.

The "polyvalent alcohol having an equilibrium water content of greater than or equal to 30% at a temperature of 23° C. and a relative humidity of 80%" is used in, e.g., Japanese Unexamined Patent Application Publication Nos. 2012-207202 (Patent document 1) and 2014-94998 (Patent document 2).

Examples of the "polyvalent alcohol having an equilibrium water content of greater than or equal to 30% at a temperature of 23° C. and a relative humidity of 80%" include 1,2,3-butanetriol (equilibrium water content: 38%), 1,2,4-butanetriol (equilibrium water content: 41%), glycerin (equilibrium water content: 49%, SP value: 16.38), diglycerin (equilibrium water content: 38%), triethylene glycol (equilibrium water content: 39%, SP value: 15.4), tetraethylene glycol (equilibrium water content: 37%), diethylene glycol (equilibrium water content: 43%), and 1,3-butanediol (equilibrium water content: 35%).

<Colorant>

It is preferable to use a water-dispersible pigment as the colorant. It is also possible to use a dye in combination in order to adjust color tones. However, it is desirable to use a dye in a range in which weatherability is not degraded.

Examples of pigments in the water-dispersible pigment include organic pigments and inorganic pigments.

Examples of the inorganic pigments include titanium oxide, iron oxide, calcium carbonate, barium sulfate, aluminium hydroxide, barium yellow, cadmium red, chromium yellow, and carbon black. Among these inorganic pigments, carbon black is preferable.

Examples of the carbon black (Pigment Black 7) include products produced by known methods such as a contact method, a furnace method, and a thermal method. Examples of the products include channel black, furnace black, gas black, and lamp black.

Examples of commercially available products of the carbon black include: carbon black available from Cabot Corporation under trademarks of REGAL (registered trademark), BLACK PEARLS (registered trademark), ELFTEX (registered trademark), MONARCH (registered trademark), MOGUL (registered trademark), and VULCAN (registered trademark) (e.g., BLACK PEARLS 2000, BLACK PEARLS 1400, BLACK PEARLS 1300, BLACK PEARLS 1100, BLACK PEARLS 1000, BLACK PEARLS 900, BLACK PEARLS 880, BLACK PEARLS 800, BLACK PEARLS 700, BLACK PEARLS 570, BLACK PEARLS L, ELFTEX 8, MONARCH 1400, MONARCH 1300, MONARCH 1100, MONARCH 1000, MONARCH 900, MONARCH 880, MONARCH 800, MONARCH 700, MOGUL L, REGAL 330, REGAL 400, REGAL 660, and VULCAN P); SENSIJET BLACK SDP 100 (available from Sensient Technologies Corporation); SENSIJET BLACK SDP 1000 (available from Sensient Technologies Corporation); and SENSIJET BLACK SDP 2000 (available from Sensient Technologies Corporation). One of these products may be used alone or two or more of these products may be used in combination.

Examples of the organic pigments include azo-pigments, polycyclic pigments, dye chelates, nitro pigments, nitroso pigments, and aniline black. Among these organic pigments, azo-pigments and polycyclic pigments are preferable.

Examples of the azo-pigments include azo lake, insoluble azo-pigments, condensed azo-pigments, and chelate azo-pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments. Examples of the dye chelates include basic dye-based chelates and acid dye-based chelates.

Specific examples of the organic pigments include: C.I. Pigment Yellows 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 155, 153, 180, 183, 185, and 213; C.I. Pigment Oranges 5, 13, 16, 17, 36, 43, and 51; C.I. Pigment Reds 1, 2, 3, 5, 17, 22, 23, 31, 38, 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, and 219; C.I. Pigment Violets 1 (rhodamine lake), 3, 5:1, 16, 19, 23, and 38; C.I. Pigment Blues 1, 2, 15 (phthalocyanine blue), 15:1, 15:2, 15:3 (phthalocyanine blue), 16, 17:1, 56, 60, and 63; and C.I. Pigment Greens 1, 4, 7, 8, 10, 17, 18, and 36. One of these organic pigments may be used alone or two or more of these organic pigments may be used in combination.

A specific surface area of the pigment is not particularly limited and may be appropriately selected depending on the intended purpose. However, the specific surface area is preferably greater than or equal to 10 m$^2$/g but less than or equal to 1,500 m$^2$/g, more preferably greater than or equal to 20 m$^2$/g but less than or equal to 600 m$^2$/g, and yet more preferably greater than or equal to 50 m$^2$/g but less than or equal to 300 m$^2$/g.

Any pigment that does not have the desired specific surface area may be adjusted by size reduction or a pulverization treatment (e.g., ball mill pulverization, jet mill pulverization, or ultrasonic treatment) to have a relatively small particle diameter.

A volume average particle diameter of the pigment is preferably greater than or equal to 10 nm but less than or equal to 200 nm in the ink.

Examples of the water-dispersible pigment include (1) a surfactant-dispersed pigment obtained by dispersing a pigment with a surfactant, (2) a resin-dispersed pigment obtained by dispersing a pigment with a resin, (3) a resin-coated-dispersed pigment obtained by coating a surface of a pigment with a resin, and (4) a self-dispersible pigment having a hydrophilic group on a surface of the pigment.

Among these water-dispersible pigments, (3) the resin-coated-pigment obtained by coating a surface of a pigment with a resin and (4) the self-dispersible pigment having a hydrophilic group on a surface of the pigment are preferable because these pigments have a high temporal storage stability and can suppress viscosity thickening upon water evaporation.

Preferable as (4) the self-dispersible pigment having a hydrophilic functional group is an anionically charged pigment. Examples of anionic functional groups include —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$. Examples of a counter ion M include alkali metal ions and quaternary ammonium ions. Of these counter ions, quaternary ammonium ions are preferable.

Examples of the quaternary ammonium ions include tetramethylammonium ion, tetraethylammonium ion, tetrapropylammonium ion, tetrabutylammonium ion, tetrapentylammonium ion, benzyltrimethylammonium ion, benzyltriethylammonium ion, and tetrahexylammonium ion. Among these quaternary ammonium ions, tetraethylammonium ion, tetrabutylammonium ion, and benzyltrimethyl ammonium ion are preferable. Among these quaternary ammonium ions, tetrabutylammonium ion is preferable.

It is estimated that a self-dispersible pigment containing the hydrophilic functional group and the quaternary ammonium ion can exhibit affinity in both of a water-rich ink and an organic solvent-rich ink from which a water content has evaporated and can stably maintain a dispersed state.

Particularly, an ink using a self-dispersible pigment which is reformed with at least one of a geminal bisphosphonic acid group and a geminal bisphosphonic acid salt group has an excellent redispersibility after drying. Therefore, even when the water content of the ink about inkjet head nozzles has evaporated after a long term of suspension of printing, the nozzles have not been clogged and a favorable printing operation can be performed with a simple cleaning operation. Furthermore, the ink has a high temporal storage stability and can be suppressed from viscosity thickening upon water evaporation. Therefore, the ink is extraordinarily excellent in ink adherence and discharging reliability in a head maintaining device.

Specific examples of the phosphonic acid group or the phosphonic acid salt group include phosphonic acid groups or phosphonic acid salt groups represented by any of the structural formulae (i) to (iv) below.

Structural formula (i)

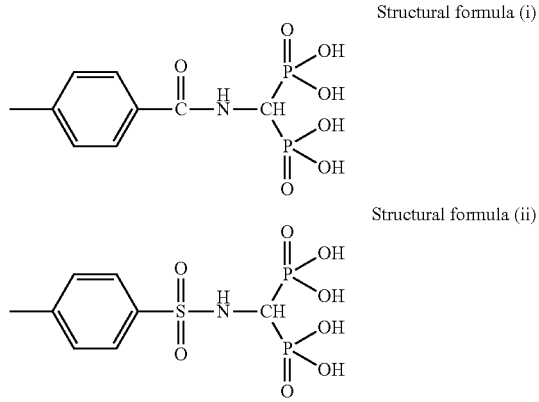

Structural formula (ii)

Structural formula (iii)

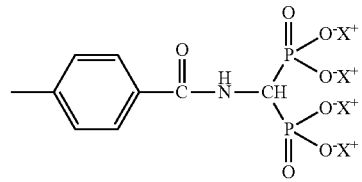

In the structural formula (iii) above, X$^+$ represents any one of Li$^+$, K$^+$, Na$^+$, NH$_4^+$, N(CH$_3$)$_4^+$, N(C$_2$H$_5$)$_4^+$, N(C$_3$H$_7$)$_4^+$, and N(C$_4$H$_9$)$_4^+$.

Structural formula (iv)

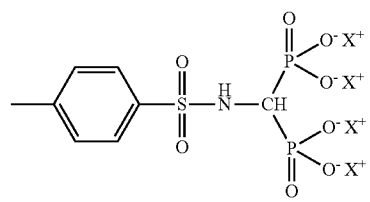

In the structural formula (iv) above, X$^+$ represents any one of Li$^+$, K$^+$, Na$^+$, NH$_4^+$, N(CH$_3$)$_4^+$, N(C$_2$H$_5$)$_4^+$, N(C$_3$H$_7$)$_4^+$, and N(C$_4$H$_9$)$_4^+$.

—Treatment for Reforming Pigment Surface—

A treatment for reforming the surface of the pigment with, for example, a geminal bisphosphonic acid group will be described. Examples of a reforming method include a method A and a method B described below.

[Method A]

Carbon black (20 g), a compound represented by a structural formula (v) or structural formula (vi) below (20 mmol), and ion-exchanged highly pure water (200 mL) are mixed under a room temperature environment with a SILVERSON mixer (6,000 rpm). When a resultant slurry has a pH of higher than 4, nitric acid (20 mmol) is added to the slurry. Thirty minutes later, sodium nitrite (20 mmol) dissolved in a small amount of ion-exchanged highly pure water is slowly added into the mixture. The mixture is heated to 60° C. while being stirred and is reacted for 1 hour to produce a reformed pigment in which the compound represented by the structural formula (v) or structural formula (vi) below is added to the carbon black. Then, the reformed pigment is adjusted to a pH of 10 with a NaOH aqueous solution. This results in a reformed pigment dispersion in 30 minutes. Then, the dispersion and ion-exchanged highly pure water are subjected to ultrafiltration through a dialysis membrane and then subjected to ultrasonic dispersion to obtain a reformed pigment dispersion in which a solid content is condensed.

[Method B]

A PROCESSALL 4HV mixer (4 L) is loaded with dry carbon black (500 g), ion-exchanged highly pure water (1 L), and a compound represented by the structural formula (v) or structural formula (vi) below (1 mol). Then, the mixture is strongly mixed at 300 rpm for 10 minutes while being heated to 60° C. A 20% sodium nitrite aqueous solution [in an amount equivalent to 1 mol of the compound represented by the structural formula (v) or structural formula (vi)] is added to the mixture in 15 minutes, and the resultant is mixed and stirred for 3 hours while being heated to 60° C.

The resultant reaction product is extracted through dilution with ion-exchanged highly pure water (750 mL). The obtained reformed pigment dispersion and ion-exchanged highly pure water are subjected to ultrafiltration through a dialysis membrane and then subjected to ultrasonic dispersion to obtain a reformed pigment dispersion in which a solid content is condensed. When coarse particles are included in abundance, it is desirable to remove the coarse particles with a centrifuge or the like.

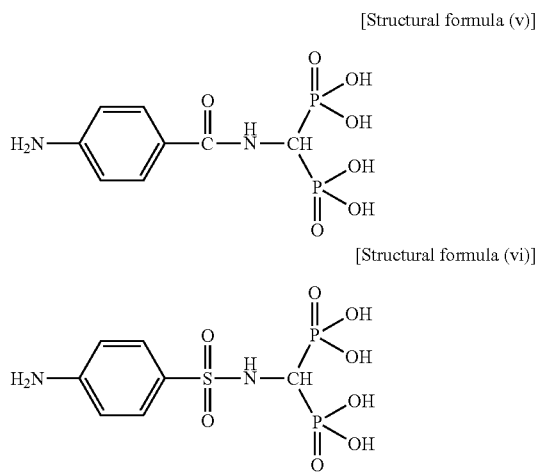 [SMILES: Nc1ccc(C(=O)NC(P(=O)(O)O)P(=O)(O)O)cc1 ; Nc1ccc(S(=O)(=O)NC(P(=O)(O)O)P(=O)(O)O)cc1]

[Structural formula (v)]

[Structural formula (vi)]

A pH adjuster may be added to the obtained reformed pigment dispersion as needed. The pH adjuster may be the same as any of below-described pH adjusters for the ink. Among such pH adjusters, $Na^+$, $N(CH_3)_4^+$, $N(C_2H_5)_4^+$, $N(C_3H_7)_4^+$, and $N(C_4H_9)_4^+$ are preferable.

Through a treatment with the pH adjuster, at least part of the compound represented by the structural formula (v) or structural formula (vi) above changes to a salt of the compound (i.e., to a compound corresponding to the structural formula (iii) or structural formula (iv) above).

Preferable as (3) the resin-coated pigment obtained by coating a surface of a pigment with a resin is a polymer emulsion obtained by adding a pigment to polymer particles.

The polymer emulsion obtained by adding a pigment to polymer particles refers to a polymer emulsion obtained by encapsulating a pigment in polymer particles or a polymer emulsion obtained by adsorbing a pigment to a surface of polymer particles. In this case, there is no need for all of the pigment particles to be encapsulated or adsorbed, but the pigment may be dispersed in the emulsion in a range in which the effect of the present invention is not spoiled.

Examples of a polymer to form the polymer emulsion (i.e., a polymer in the polymer particles) include vinyl-based polymers, polyester-based polymers, and polyurethane-based polymers. Polymers that can be used particularly preferably are vinyl-based polymers and polyester-based polymers, which may be the polymers disclosed in Japanese Unexamined Patent Application Publication Nos. 2000-53897 and 2001-139849.

In this case, it is preferable to use common organic pigments or composite pigments obtained by coating inorganic pigment particles with an organic pigment or carbon black. The composite pigments can be produced by a method for depositing an organic pigment in the presence of inorganic pigment particles, a mechanochemical method for mechanically mixing and grinding an inorganic pigment and an organic pigment, etc.

Furthermore, as needed, it is possible to improve adhesiveness between the inorganic pigment and the organic pigment by providing a layer of an organosilane compound produced from polysiloxane and alkylsilane between the inorganic pigment and the organic pigment.

The organic pigment and the inorganic pigment are not particularly limited and may be appropriately selected from the pigments presented above.

A mass ratio between the inorganic pigment particles and the organic pigment or carbon black, which is the colorant, is preferably in a range of from 3:1 through 1:3 and more preferably in a range of from 3:2 through 1:2.

When the colorant is short, a chromogenic property and a coloring power may be poor. When the colorant is excessive, transparency and color tones may be poor.

Preferable as such coloring particles obtained by coating inorganic pigment particles with an organic pigment or carbon black are a silica/carbon black composite material, a silica/phthalocyanine PB 15:3 composite material, a silica/disazo yellow composite material, and a silica/quinacridone PR122 composite material, etc. available from Todakogyo Corp. because these materials have a small average primary particle diameter.

When inorganic pigment particles having a primary particle diameter of 20 nm is coated with an equal amount of an organic pigment, the primary particle diameter of the resultant pigment becomes about 25 nm. When the resultant pigment can be dispersed to primary particles with an appropriate dispersant, it is possible to produce a very minute pigment-dispersed ink having a dispersed particle diameter of 25 nm.

With the composite pigment, what contributes to dispersion is not only the organic pigment over the surface but also the centered inorganic pigment, which exhibits own properties through a thin layer of the organic pigment having a thickness of 2.5 nm. Therefore, what weighs is the selection of a pigment dispersant that can disperse and stabilize both of the organic and inorganic pigments simultaneously.

A content of the colorant is preferably greater than or equal to 1% by mass but less than or equal to 15% by mass and more preferably greater than or equal to 2% by mass but less than or equal to 10% by mass of the total amount of the ink. When the content is greater than or equal to 1% by mass, a sufficient ink chromogenic property and a sufficient image density can be obtained. When the content is less than or equal to 15% by mass, the ink is prevented from being thickened and degraded in dischargeability and there is also a cost-saving advantage.

<Water>

The water may be pure water or ultrapure water such as ion-exchanged water, ultrafiltrated water, reverse osmotic water, and distilled water.

A content of the water in the ink is not particularly limited and may be appropriately selected depending on the intended purpose.

<Surfactant>

It is preferable to add a polyether-modified siloxane compound as the surfactant.

Use of the polyether-modified siloxane compound as the surfactant makes the ink hardly wettable over an ink-repellent layer over a nozzle plate of an ink head. This prevents a discharging failure due to adhesion of the ink to the nozzles and improves discharging stability.

At least one kind selected from the group consisting of compounds represented by general formulae (III) to (VI) below is preferable as the polyether-modified siloxane compound in terms of dispersion stability that does not depend on the kind of the colorant and combination with the organic solvent and in terms of permeability and a leveling property that are based on a low dynamic surface tension.

[General formula (III)]

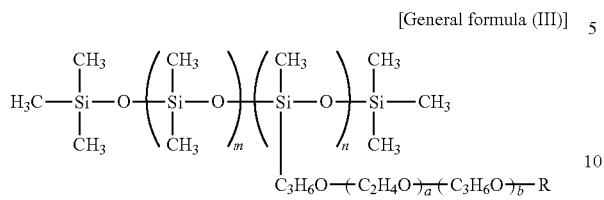

In the general formula (III) above, m represents an integer in a range of from 0 through 23, n represents an integer in a range of from 1 through 10, a represents an integer in a range of from 1 through 23, b represents an integer in a range of from 0 through 23, and R represents a hydrogen atom or an alkyl group containing 1 through 4 carbon atoms.

[General formula (IV)]

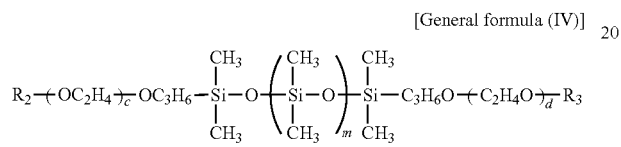

In the general formula (IV) above, m represents an integer in a range of from 1 through 8, c and d represent an integer in a range of from 1 through 10, and $R_2$ and $R_3$ represent a hydrogen atom or an alkyl group containing 1 through 4 carbon atoms.

[General formula (V)]

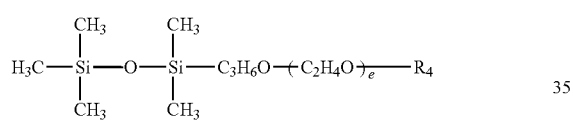

In the general formula (V) above, e represents an integer in a range of from 1 through 8 and $R_4$ represents a hydrogen atom or an alkyl group containing 1 through 4 carbon atoms.

[General formula (VI)]

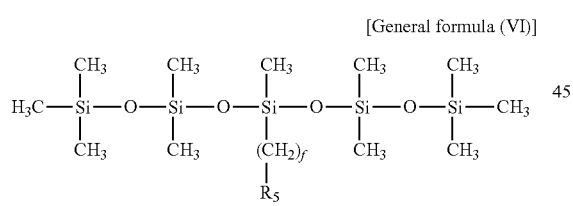

In the general formula (VI) above, f represents an integer in a range of from 1 through 8 and $R_5$ represents a polyether group represented by a general formula (A) below.

[General formula (A)]

In the general formula (A) above, g represents an integer in a range of from 0 through 23, h represents an integer in a range of from 0 through 23, where g and h do not take 0 at the same time, and $R_6$ represents a hydrogen atom or an alkyl group containing 1 through 4 carbon atoms.

Examples of polyether-modified siloxane compounds represented by the general formula (III) above include, but are not limited to, compounds represented by structural formulae below.

[Structural formula (VI)]

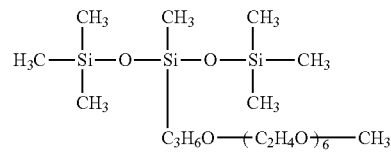

[Structural formula (VII)]

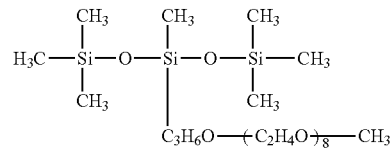

[Structural formula (VIII)]

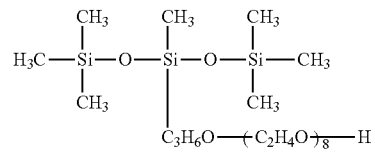

[Structural formula (IX)]

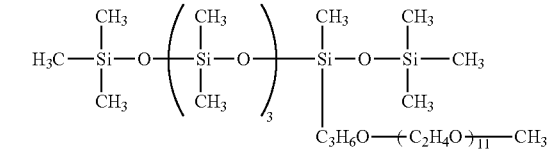

[Structural formula (X)]

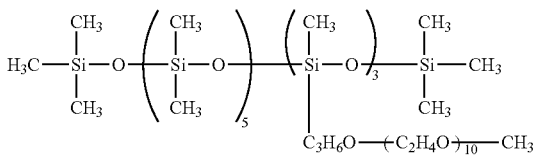

[Structural formula (XI)]

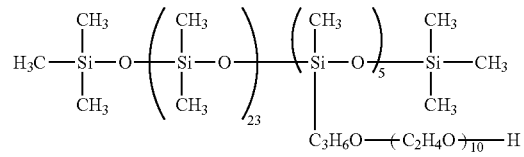

[Structural formula (XII)]

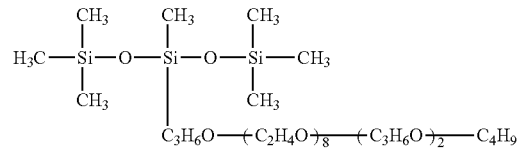

[Structural formula (XIII)]

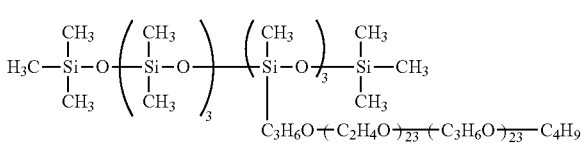

Examples of polyether-modified siloxane compounds represented by the general formula (IV) above include, but are not limited to, compounds represented by a structural formula below.

[Structural formula (XIV)]

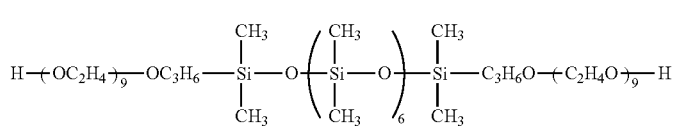

Examples of polyether-modified siloxane compounds represented by the general formula (V) above include, but are not limited, to compounds represented by a structural formula below.

[Structural formula (XV)]

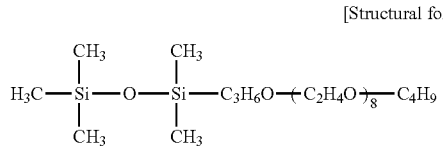

Examples of polyether-modified siloxane compounds represented by the general formula (VI) above include, but are not limited to, compounds represented by structural formulae below.

[Structural formula (XVI)]

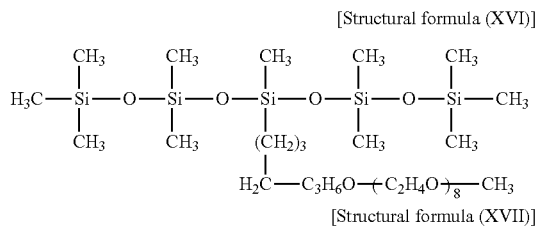

[Structural formula (XVII)]

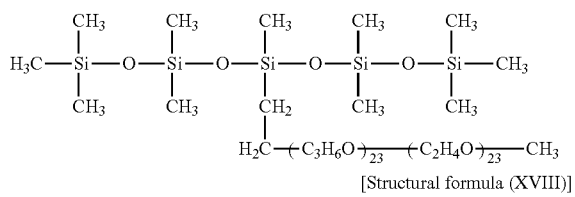

[Structural formula (XVIII)]

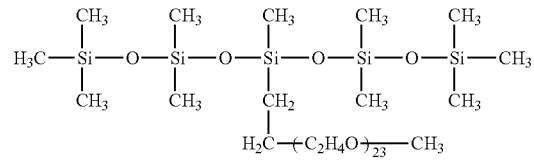

The polyether-modified siloxane compound may be an appropriately synthesized product or a commercially available product.

A method for synthesizing the polyether-modified siloxane compound is not particularly limited and may be appropriately selected depending on the intended purpose. For example, descriptions in Japanese Patent Nos. 5101598, 5032325, and 5661229 can be referred to.

Specifically, the polyether-modified siloxane compound can be synthesized by making (A) a polyether and (B) an organohydrogensiloxane undergo a hydrosilylation reaction.

The polyether as the component (A) refers to a polyoxyalkylene copolymer represented by $-(C_nH_{2n}O)-$ (where n in the formula is in a range of from 2 through 4).

Examples of units to constitute the polyoxyalkylene copolymer include an oxyethylene unit $-(C_2H_4O)-$, an oxypropylene unit $-(C_3H_6O)-$, an oxybutylene unit $-(C_4H_8O)-$, and any mixture unit of these units. The oxyalkylene units may be arranged in any formation and can form any one of a block structure and a random copolymer structure. A random copolymer structure is preferable. It is preferable that the polyoxyalkylene contain both of the oxyethylene unit $(C_2H_4O)$ and the oxypropylene unit $(C_3H_6O)$ in the random copolymer.

The organohydrogensiloxane as the component (B) is an organopolysiloxane containing at least one hydrogen atom bound to silicon (SiH) per molecule. Examples of the organopolysiloxane include a randomly selected number of or a randomly selected combination of siloxy units such as $(R_3SiO_{0.5})$, $(R_2SiO)$, $(RSiO_{1.5})$, and $(SiO_2)$ (where R in the formulae is independently an organic group or a hydrocarbon group).

When R in $(R_3SiO_{0.5})$, $(R_2SiO)$, and $(RSiO_{1.5})$ in the organopolysiloxane are a methyl group, these siloxy units are represented as a M unit, a D unit, and a T unit. On the other hand, the $(SiO_2)$ siloxy unit is represented as a Q unit.

The organohydrogensiloxane has a similar structure but contains at least one SiH that is present on a siloxy unit.

Examples of methyl-based siloxy units in the organohydrogensiloxane include and can be represented as a "$M^H$" siloxy unit $(R_2HSiO_{0.5})$, a "$D^H$" siloxy unit (RHSiO), and "$T^H$" siloxy unit $(HSiO_{1.5})$.

The organohydrogensiloxane can contain a randomly selected number of M, $M^H$, D, $D^H$, T, $T^H$, or Q siloxy units on the condition that at least one siloxy unit contain SiH.

The component (A) and the component (B) are made to undergo a hydrosilylation reaction. The hydrosilylation reaction is not particularly limited and may be appropriately selected depending on the intended purpose. However, it is preferable to perform the reaction with addition of a hydrosilylating catalyst.

The hydrosilylating catalyst is not particularly limited and may be appropriately selected depending on the intended purpose. Examples of the hydrosilylating catalyst include a metal selected from the group consisting of platinum, rhodium, ruthenium, palladium, osmium, and iridium, or an organometallic compound of any of these metals, or any combination of these metals and organometallic compounds of these metals.

A content of the hydrosilylating catalyst is preferably in a range of from 0.1 ppm through 1,000 ppm and more preferably in a range of from 1 ppm through 100 ppm based on the weights of the component (A) and the component (B).

The hydrosilylation reaction can be performed without dilution or in the presence of a solvent. It is preferable to perform the hydrosilylation reaction in the presence of a solvent.

Examples of the solvent include: alcohols (e.g., methanol, ethanol, isopropanol, butanol, or n-propanol); ketones (e.g., acetone, methyl ethyl ketone, or methyl isobutyl ketone); aromatic hydrocarbons (e.g., benzene, toluene, or xylene); aliphatic hydrocarbons (e.g., heptane, hexane, or octane); glycolethers (e.g., propyleneglycolmethylether, dipropyleneglycolmethylether, propyleneglycol n-butylether, propyleneglycol n-propylether, or ethyleneglycol n-butylether); halogenated hydrocarbons (e.g., dichloromethane, 1,1,1-trichloroethane, methylene chloride, or chloroform); dimethylsulfoxide; dimethylformamide; acetonitrile; tetrahydrofuran; volatile oils; mineral spirits; and naphthas. One of these solvents may be used alone or two or more of these solvents may be used in combination.

Amounts of the component (A) and the component (B) used for the hydrosilylation reaction are not particularly limited and may be appropriately adjusted depending on the intended purpose. The amounts are represented by a ratio by mole between all unsaturated groups in the component (A) and a SiH content in the component (B). It is preferable to perform the hydrosilylation reaction using polyether unsaturated groups in an amount of less than or equal to 20% by mole and more preferably in an amount of less than or equal to 10% by mole of an amount by mole of SiH in the organohydrogensiloxane.

The hydrosilylation reaction is not particularly limited and may be appropriately selected depending on the intended purpose. Examples of a method for the hydrosilylation reaction include a batch method, a semi-continuous method, and a continuous method. For example, it is possible to perform the hydrosilylation reaction by a continuous method using a plug flow reactor.

Examples of commercially available products of the polyether-modified siloxane compound include: 71 ADDITIVE, 74 ADDITIVE, 57 ADDITIVE, 8029 ADDITIVE, 8054 ADDITIVE, 8211 ADDITIVE, 8019 ADDITIVE, 8526 ADDITIVE, FZ-2123, and FZ-2191 (all available from Dow Corning Toray Co., Ltd.); TSF4440, TSF4441, TSF4445, TSF4446, TSF4450, TSF4452, and TSF4460 (all available from Momentive Performance Materials Inc.); SILFACE SAG002, SILFACE SAG003, SILFACE SAG005, SILFACE SAG503A, SILFACE SAG008, and SILFACE SJM003 (all available from Nissin Chemical Co., Ltd.); TEGO WET KL245, TEGO WET 250, TEGO WET 260, TEGO WET 265, TEGO WET 270, and TEGO WET 280 (all available from Evonik Industries AG); and BYK-345, BYK-347, BYK-348, BYK-375, and BYK-377 (all available from Byk-Chemie Japan K.K.). One of these products may be used alone or two or more of these products may be used in combination.

Among these products, TEGO WET 270 (available from Evonik Industries AG) and SILFACE SAG503A (available from Nissin Chemical Co., Ltd.) are preferable.

As the surfactant, a fluorosurfactant, a silicone-based surfactant, or an acetyleneglycol or acetylenealcohol-based surfactant may be used in combination with the polyether-modified siloxane compound.

A content of the surfactant is preferably greater than or equal to 0.001% by mass but less than or equal to 5% by mass and more preferably greater than or equal to 0.5% by mass but less than or equal to 3% by mass of the total amount of the ink. When the content is greater than or equal to 0.001% by mass but less than or equal to 5% by mass, the ink is hardly wettable over an ink-repellent layer over a nozzle plate of an ink head. This makes it possible to obtain an effect of preventing a discharging failure due to adhesion of the ink to the nozzles and improving discharging stability.

<Water-Dispersible Resin>

The water-dispersible resin has an excellent film forming property (image forming property), a high water repellency, a high water resistance, and a high weatherability and is effective for recording images with a high water resistance and a high image density (a high chromogenic property).

Examples of the water-dispersible resin include condensed synthetic resins, additive synthetic resins, and natural polymeric compounds. One of these water-dispersible resins may be used alone or two or more of these water-dispersible resins may be used in combination.

Examples of the condensed synthetic resins include polyester resins, polyurethane resins, polyepoxy resins, polyamide resins, polyether resins, poly(meth)acrylic resins, acrylic-silicone resins, and fluorine-based resins.

Examples of the additive synthetic resins include polyolefin resins, polystyrene-based resins, polyvinyl alcohol-based resins, polyvinyl ester-based resins, polyacrylic acid-based resins, and unsaturated carboxylic acid-based resins.

Examples of natural polymeric compounds include celluloses, rosins, and natural rubbers.

Among these resins, fluorine-based resins and acrylic-silicone resins are preferable.

Preferable among the fluorine-based resins are fluorine-based resins containing a fluoroolefin unit. More preferable are fluorine-containing vinylether-based resins containing a fluoroolefin unit and a vinylether unit.

The fluoroolefin unit is not particularly limited and may be appropriately selected depending on the intended purpose. Examples of the fluoroolefin unit include —$CF_2CF_2$—, —$CF_2CF(CF_3)$—, and —$CF_2CFCl$—.

The vinylether unit is not particularly limited and may be appropriately selected depending on the intended purpose. Examples of the vinylether unit include compounds represented by structural formulae below.

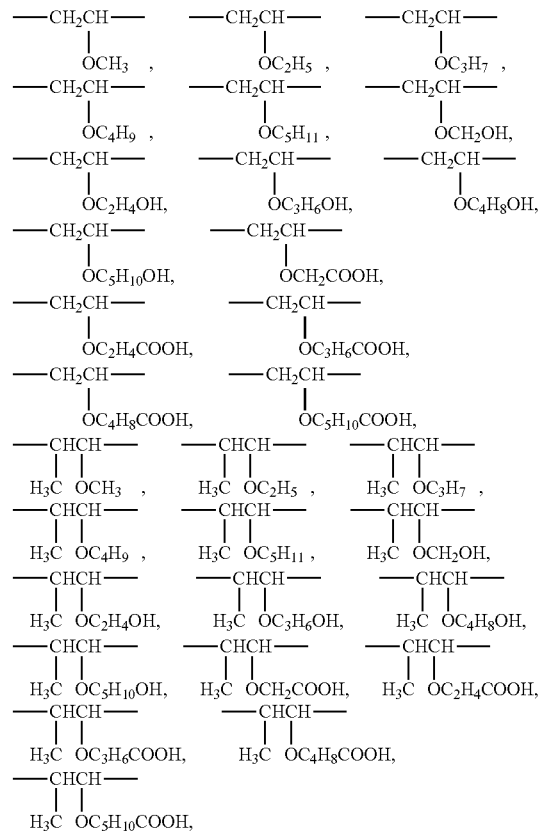

Preferable as the fluorine-containing vinylether-based resins containing the fluoroolefin unit and the vinylether unit are alternate copolymers in which the fluoroolefin unit and the vinylether unit are alternately copolymerized.

The fluorine-based resins may be appropriately synthesized products or commercially available products. Examples of the commercially available products include: FLUONATE FEM-500 and FEM-600, DICGUARD F-52S, F-90, F-90M, and F-90N, and AQUAFLAN TE-5A available from DIC Corporation; and LUMIFLON FE4300, FE4500, and FE4400, ASAHIGUARD AG-7105, AG-950, AG-7600, AG-7000, and AG-1100 available from Asahi Glass Co., Ltd.

The water-dispersible resin may be used in a form of a homopolymer or in a form of a copolymer as a composite resin. The water-dispersible resin of any of a single-phase structure type, a core-shell type, and a power-feed emulsion type may be used.

The water-dispersible resin may be a resin that contains a hydrophilic group and has self-dispersibility and a resin that does not have dispersibility but is provided with dispersibility by means of a surfactant or a resin containing a hydrophilic group. The most appropriate among such resins are ionomers of polyester resins and polyurethane resins and emulsions of resin particles obtained by emulsification and suspension polymerization of unsaturated monomers. In the case of emulsion polymerization of an unsaturated monomer, a resin emulsion is obtained by inducing a reaction in water to which the unsaturated monomer, a polymerization initiator, a surfactant, a chain-transfer agent, a chelate agent, a pH adjuster, etc. are added. This makes it easy to obtain the water-dispersible resin and makes it easy to change the constitution of the resin and produce the intended properties.

Examples of the unsaturated monomers include unsaturated carboxylic acids, monofunctional or multifunctional (meth)acrylic acid ester monomers, (meth)acrylic acid amide monomers, aromatic vinyl monomers, vinylcyano compound monomers, vinyl monomers, allyl compound monomers, olefin monomers, diene monomers, and unsaturated-carbon-containing oligomers. These unsaturated monomers may be used alone or more than one of these unsaturated monomers may be used in combination. Combination of these monomers enables flexible reformation of the properties. Use of an oligomer-based polymerization initiator for a polymerization reaction or a graft reaction enables reformation of the properties of the resin.

Examples of the unsaturated carboxylic acids include acrylic acid, methacrylic acid, itaconic acid, fumaric acid, and maleic acid.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salt, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate, and acryloxyethyltrimethyl ammonium salt.

Examples of the multifunctional (meth)acrylic acid ester monomers include ethylene glycol dimethacrylate, diethylene glycol dimethacrylate, triethylene glycol dimethacrylate, polyethylene glycol dimethacrylate, 1,3-butyleneglycol dimethacrylate, 1,4-butyleneglycol dimethacrylate, 1,6-hexanediol dimethacrylate, neopentyl glycol dimethacrylate, dipropyleneglycol dimethacrylate, polypropyleneglycol dimethacrylate, polybutyleneglycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butyleneglycol diacrylate, 1,4-butyleneglycol diacrylate, 1,6-hexanediol diacrylate, neopentyl glycol diacrylate, 1,9-nonanediol diacrylate, polypropyleneglycol diacrylate, 2,2'-bis(4-acryloxypropyloxyphenyl) propane, 2,2'-bis(4-acryloxydiethoxyphenyl)propanetrimethylolpropane triacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexaacrylate.

Examples of the (meth)acrylic acid amide monomers include acrylamides, methacrylamides, N,N-dimethylacrylamides, methylenebisacrylamides, and 2-acrylamide-2-methylpropane sulfonic acid.

Examples of the aromatic vinyl monomers include styrene, α-methylstyrene, vinyltoluene, 4-t-butylstyrene, chlorostyrene, vinylanisole, vinylnaphthalene, and divinylbenzene.

Examples of the vinylcyano compound monomers include acrylonitrile and methacrylonitrile.

Examples of the vinyl monomers include vinyl acetate, vinylidene chloride, vinyl chloride, vinylethers, vinylketones, vinylpyrrolidones, vinylsulfonic acid or salts of the vinylsulfonic acid, vinyltrimethoxysilane, and vinyltriethoxysilane.

Examples of the allyl compound monomers include allylsulfonic acid or salts of the allylsulfonic acid, allylamines, allyl chloride, diallylamines, and diallyldimethyl ammonium salt.

Examples of the olefin monomers include ethylene and propylene.

Examples of the diene monomers include butadiene and chloroprene.

Examples of the unsaturated-carbon-containing oligomers include methacryloyl-group-containing styrene oligomers, methacryloyl-group-containing styrene-acrylonitrile oligomers, methacryloyl-group-containing methyl methacrylate oligomers, methacryloyl-group-containing dimethyl siloxane oligomers, and acryloyl-group-containing polyester oligomers.

The water-dispersible resin may undergo a molecular chain breakage such as distribution rupture and hydrolysis under strong alkaline or strong acidic conditions. Therefore, a pH of the water-dispersible resin is preferably in a range of from 4 through 12, more preferably in a range of from 6 through 11 in terms of miscibility with a water-dispersible colorant, and yet more preferably in a range of from 7 through 11.

A volume average particle diameter of the water-dispersible resin is related with a viscosity of a dispersion liquid. Therefore, a viscosity of a composition increases when a particle diameter of the composition is reduced with a solid content of the composition maintained. The volume average particle diameter of the water-dispersible resin is preferably greater than or equal to 50 nm in order for the obtained ink not to have an excessively high viscosity.

A particle diameter of several tens of micrometers is larger than nozzle holes of an inkjet head. This makes it impossible to use the ink. Presence of particles having a large particle diameter in the ink degrades dischargeability even though the particle diameter is smaller than the nozzle holes. Therefore, in order not to inhibit ink dischargeability, the volume average particle diameter is preferably less than or equal to 200 nm and more preferably less than or equal to 150 nm.

It is preferable that the water-dispersible resin have a function for fixing the colorant over a paper surface, and turn to a coating film at normal temperature and improve fixability of the colorant. Therefore, a minimum filming temperature (MFT) of the water-dispersible resin is preferably lower than or equal to 30° C. When a glass transition temperature of the water-dispersible resin is lower than or equal to −40° C., a coating film of the resin has a high viscosity to make a printed matter tacky. Therefore, a water-dispersible resin having a glass transition temperature of higher than or equal to −30° C. is preferable.

A content of the water-dispersible resin as expressed in a solid content is preferably greater than or equal to 0.5% by mass but less than or equal to 10% by mass and more preferably greater than or equal to 1% by mass but less than or equal to 8% by mass of the total amount of the ink.

<Other Components>

The other components are not particularly limited and may be appropriately selected as needed. Examples of the other components include a foam inhibitor (a defoamer), a pH adjuster, an antiseptic/fungicide, a chelate reagent, an anti-rust agent, an antioxidant, an ultraviolet absorber, an oxygen absorber, and a light stabilizer.

—Foam Inhibitor (Defoamer)—

The foam inhibitor (defoamer) is used as added in a small amount in the ink in order to inhibit foaming of the ink. The foaming refers to a liquid becoming a thin film to enclose air. Such properties of the ink as surface tension and viscosity contribute to generation of foams. Specifically, a liquid having a high surface tension such as water has a force acting to make a surface area of the liquid the smallest possible and hardly foams. In contrast, an ink having a high viscosity and a high permeability has a low surface tension and easily foams, and is hard to defoam because generated foams tend to be maintained by the viscosity of the solution.

Typically, the foam inhibitor reduces a surface tension of foam films locally to destroy the foams, or the foam inhibitor, which is insoluble to the foaming liquid scatters over the surface of the foaming liquid to destroy the foams. When the polyether-modified siloxane compound having an extremely high performance of reducing a surface tension is used in the ink as the surfactant, a foam inhibitor based on the former system may not be able to reduce the surface tension of foam films locally. Therefore, the foam inhibitor based on the former system is not typically used. Hence, a foam inhibitor of the latter type insoluble to the foaming liquid is used. In this case, the foam inhibitor insoluble to the solution degrades the stability of the ink.

In this regard, a foam inhibitor represented by a general formula (B) below does not have as high a performance of reducing a surface tension as the polyether-modified siloxane compound but is highly compatible with the polyether-modified siloxane compound. Therefore, it is considered that the foam inhibitor is efficiently taken into the foam films and that the surface of the foam films becomes out of balance locally due to a difference in surface tension between the polyether-modified siloxane compound and the foam inhibitor to destroy the foams.

A compound represented by the general formula (B) below is used as the foam inhibitor.

<General formula (B)>

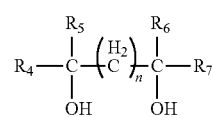

In the general formula (B) above, $R_4$ and $R_5$ independently represent an alkyl group containing 3 through 6 carbon atoms, $R_6$ and $R_7$ independently represent an alkyl group containing 1 or 2 carbon atoms, and n represents an integer in a range of from 1 through 6.

Examples of the compound represented by the general formula (B) include 2,4,7,9-tetramethyldecane-4,7-diol and 2,5,8,11-tetramethyldodecane-5,8-diol. Of these compounds, 2,5,8,11-tetramethyldodecane-5,8-diol is preferable in terms of a high foam inhibiting effect and a high compatibility with the ink.

A content of the foam inhibitor is preferably greater than or equal to 0.01% by mass but less than or equal to 10% by mass and more preferably greater than or equal to 0.1% by mass but less than or equal to 5% by mass of the total amount of the ink. When the content of the foam inhibitor is greater than or equal to 0.01% by mass, the foam inhibiting effect can be obtained. When the content of the foam inhibitor is less than or equal to 10% by mass, a favorable foam inhibiting property is obtained to make ink properties such as viscosity and particle diameter adequate.

—pH Adjuster—

The pH adjuster is not particularly limited and may be appropriately selected depending on the intended purpose so long as the pH adjuster is capable of adjusting a pH to a level in a range of from 7 through 11 without adversely affecting the ink to which the pH adjuster is blended. Examples of the pH adjuster include alcoholamines, hydroxides of alkali metal elements, hydroxides of ammonium, phosphonium hydroxides, and carbonates of alkali metals. When the pH is lower than 7 and higher than 11, an amount of an inkjet head or an ink supplying unit to be eluted into the ink is high. This may cause troubles such as degeneration, leak, and a discharging failure of the ink.

Examples of the alcoholamines include diethanolamine, triethanolamine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide and quaternary ammonium hydroxide.

Examples of the phosphonium hydroxides include quaternary phosphonium hydroxide.

Examples of the carbonates of alkali metals include lithium carbonate, sodium carbonate, and potassium carbonate.

—Antiseptic/Fungicide—

Examples of the antiseptic/fungicide include sodium dehydroacetate, sodium sorbate, sodium 2-pyridinethiol-1-oxide, sodium benzoate, and pentachlorophenol sodium.

—Chelate Reagent—

Examples of the chelate reagent include sodium ethylenediaminetetraacetate, sodium nitrilotriacetate, sodium hydroxyethyl ethylenediamine triacetate, sodium diethylenetriaminepentaacetate, and sodium uramildiacetate.

—Anti-Rust Agent—

Examples of the anti-rust agent include acidic sulfites, sodium thiosulfate, ammonium thiodiglycolate, diisopropylammonium nitrite, pentaerythritol tetranitrate, and dicyclohexylammonium nitrite.

—Antioxidant—

Examples of the antioxidant include phenol-based antioxidants (including hindered-phenol-based antioxidants), amine-based antioxidants, sulfur-based antioxidants, and phosphorus-based antioxidants.

<Method for Producing Ink>

The ink of the present invention is produced by dispersing or dissolving the colorant, the organic solvent, and the water, preferably the surfactant and the water-dispersible resin, and as needed, the other components in water and stirring and mixing these materials as needed. The stirring and mixing can be performed with, for example, a sand mill, a homogenizer, a ball mill, a paint shaker, an ultrasonic disperser, a stirrer using a stirring blade, a magnetic stirrer, and a high-speed disperser.

—Physical Properties of Ink—

Physical properties of the ink are not particularly limited and may be appropriately selected depending on the intended purpose. For example, it is preferable that viscosity and surface tension be in ranges described below.

The viscosity of the ink at 25° C. is preferably in a range of from 5 mPa·s through 25 mPa·s. The viscosity at 25° C. is more preferably in a range of from 6 mPa·s through 20 mPa·s. The ink viscosity of higher than or equal to 5 mPa·s provides an effect of improving a printing density, and a quality level of letters. On the other hand, the ink viscosity suppressed to a level lower than or equal to 25 mPa·s secures dischargeability.

The viscosity can be measured with, for example, a viscometer (RE-550L available from Toki Sangyo Co., Ltd.) at 25° C.

The ink of the present invention is favorably used for either inkjet recording or spray painting.

The ink for inkjet recording can be favorably used in printers mounted with any types of inkjet heads such as a piezo inkjet head (see Japanese Examined Patent Publication No. 02-51734) using a piezoelectric element as a pressure generating unit to pressurize an ink in an ink flow path to deform a vibration plate constituting a wall surface of the ink flow path and change the internal cubic capacity of the ink flow path to discharge ink droplets, a thermal inkjet head (see Japanese Examined Patent Publication No. 61-59911) using a heating resistor to heat an ink in an ink flow path and generate bubbles, and an electrostatic inkjet head (see Japanese Unexamined Patent Application Publication No. 06-71882) using a vibration plate constituting a wall surface of an ink flow path and an electrode disposed counter to the vibration plate to deform the vibration plate by the effect of an electrostatic force generated between the vibration plate and the electrode and change the internal cubic capacity of the ink flow path to discharge ink droplets.

(Ink Container)

An ink container of the present invention includes the ink of the present invention and a container storing the ink, and further includes other members, etc. appropriately selected as needed.

The container is not particularly limited and may be of any shape, any structure, any size, any material, etc. that may be appropriately selected depending on the intended purpose. Preferable examples of the container include a container including at least an ink bag made of, for example, an aluminium laminate film and a resin film.

Figure 2:
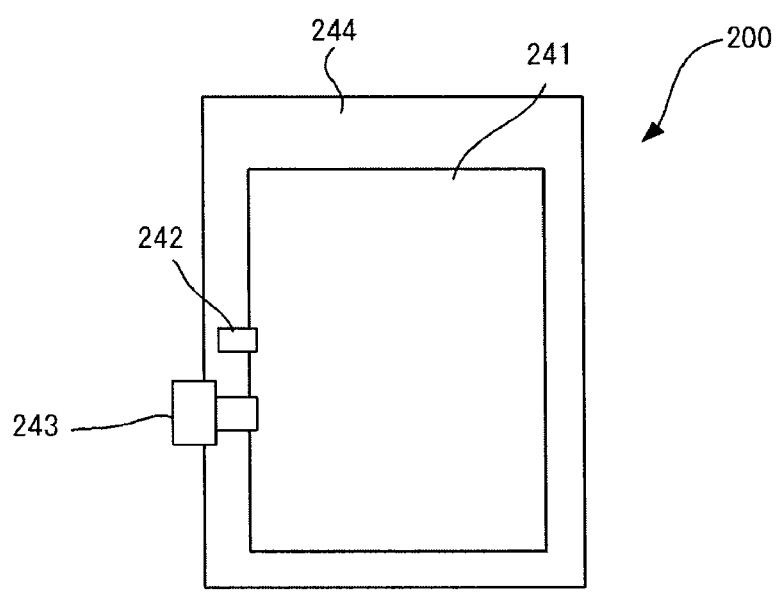
FIG. 2 is a schematic view of the ink container of FIG. 1 including a case of the ink container.

Next, the ink container will be described with reference to FIG. 1 and FIG. 2. FIG. 1 is a view illustrating an example of the ink container. FIG. 2 is a view of the ink container of FIG. 1 including a case (outer covering) of the ink container.

As illustrated in FIG. 1, in the ink container 200, an ink bag 241 is filled through an ink injecting port 242, and after evacuation of air, the ink injecting port 242 is closed by fusion bonding. For use, an ink discharging port 243 made of a rubber material is pierced with a needle of a body of an apparatus in order for the ink to be supplied into the apparatus.

The ink bag 241 is made of a gas-impermeable packaging material such as an aluminium laminate film. As illustrated in FIG. 2, the ink bag 241 is typically contained in a cartridge case 244 made of plastic and used as attached onto various types of image forming apparatuses in an attachable/detachable manner.

(Image Forming Method and Image Forming Apparatus)

An image forming method of the present invention includes at least an ink flying step and further includes other steps appropriately selected as needed.

An image forming apparatus of the present invention includes at least an ink flying unit and further includes other units appropriate selected as needed.

The image forming method of the present invention can be favorably performed by the image forming apparatus of the present invention. The ink flying step can be favorably performed by the ink flying unit. The other steps can be favorably performed by the other steps.

<Ink Flying Step and Ink Flying Unit>

The ink flying step is a step of applying a stimulus (energy) to the ink of the present invention to fly the ink and form an image over a recording medium.

The ink flying unit is a unit configured to apply a stimulus (energy) to the ink of the present invention to fly the ink and form an image over a recording medium. The ink flying unit is not particularly limited. Examples of the ink flying unit include various types of nozzles for discharging inks.

The stimulus (energy) can be generated by, for example, a stimulus generating unit. The stimulus is not particularly limited and may be appropriately selected depending on the intended purpose. Examples of the stimulus include heat (temperature), pressure, vibration, and light. One of these stimuli may be used alone or two or more of these stimuli may be used in combination. Among these stimuli, heat and pressure are preferable.

Examples of the stimulus generating unit include heating devices, pressure devices, piezoelectric elements, vibration generating devices, ultrasonic oscillators, and lights. Specific examples of the stimulus generating unit include: piezoelectric actuators such as piezoelectric elements; thermal actuators using an electro-thermal converting element such as a heating resistor to utilize a phase change upon film boiling of a liquid; shape memory alloy actuators utilizing a phase change of a metal upon a temperature change; and electrostatic actuators utilizing an electrostatic force.

A method for flying the ink is not particularly limited and is different depending on the kind of the stimulus, etc. For example, when the stimulus is "heat", there is a method using, for example, a thermal head for applying a thermal energy corresponding to a recording signal to the ink in a recording head to generate bubbles in the ink by the thermal energy and discharge and jet the ink from nozzle holes of the recording head in a form of liquid droplets by a pressure of the bubbles. When the stimulus is "pressure", there is a method for, for example, applying a voltage to a piezoelectric element bonded to a position called a pressure chamber present in an ink flow path in a recording head to flex the piezoelectric element and shrink the cubic capacity of the pressure chamber to discharge and jet the ink from nozzle holes of the recording head in a form of liquid droplets.

<Other Steps and Other Units>

The other steps are not particularly limited and may be appropriately selected depending on the intended purpose. Examples of the other steps include a drying step and a controlling step.

The other units are not particularly limited and may be appropriately selected depending on the intended purpose. Examples of the other steps include a drying unit and a controlling unit.

—Drying Step and Drying Unit—

The drying step is a step of heating and drying a recording medium over which an image is recorded with the ink and is performed by the drying unit.

The drying is not particularly limited and may be appropriately selected depending on the intended purpose. For example, the drying can be performed with an infrared dryer, a microwave dryer, a roll heater, a drum heater, or hot air. For smoothing a surface over which an image is formed and fixing the image, it is also possible to provide a fixing step of heating and thermally fixing the image with a heating unit at a temperature of higher than or equal to 100° C. but lower than or equal to 150° C.

With the fixing step, gloss and fixability of an image recorded matter are improved. Here, preferable examples of a thermal fixing unit include a roller and a drum heater that include a mirror surface to be heated. The mirror surface portion (smooth portion) of the roll heater and drum heater can be brought into contact with the surface over which an image is formed. A fixing roller heated to a heating temperature in a range of from 100° C. through 150° C. is preferable in consideration of image qualities, safety, and cost efficiency.

—Controlling Step and Controlling Unit—

The controlling step is a step of controlling each of the steps described above and is performed by the controlling unit.

The controlling unit is not particularly limited and may be appropriately selected depending on the intended purpose so long as the controlling unit is capable of controlling the operations of each unit. Examples of the controlling unit include devices such as a sequencer and a computer.

Here, an embodiment for working the image forming method of the present invention with the image forming apparatus of the present invention will be described with reference to the drawings.

Figure 3:
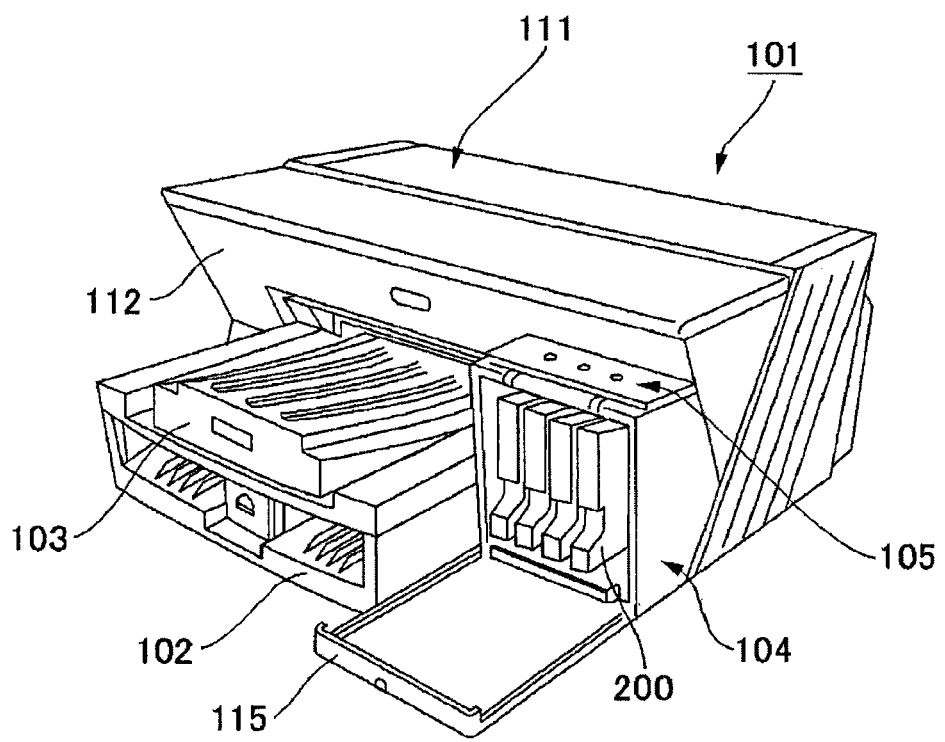
FIG. 3 is a perspective view illustrating an example of an image forming apparatus of the present invention.

An image forming apparatus illustrated in FIG. 3 includes an apparatus body 101, a paper feeding tray 102 attached on the apparatus body 101 and configured to load the apparatus body 101 with sheets, a paper ejecting tray 103 that is attached on the apparatus body 101 and over which sheets having a recorded (formed) image are stocked, and an ink cartridge loading portion 104. Various types of recording media can be fed with the paper feeding tray 102.

An operating unit 105 such as operating keys and a display is provided over a top surface of the ink cartridge loading portion 104. The ink cartridge loading portion 104 includes an openable/closable front cover 115 to be loaded and unloaded with ink cartridges 200.

Figure 4:
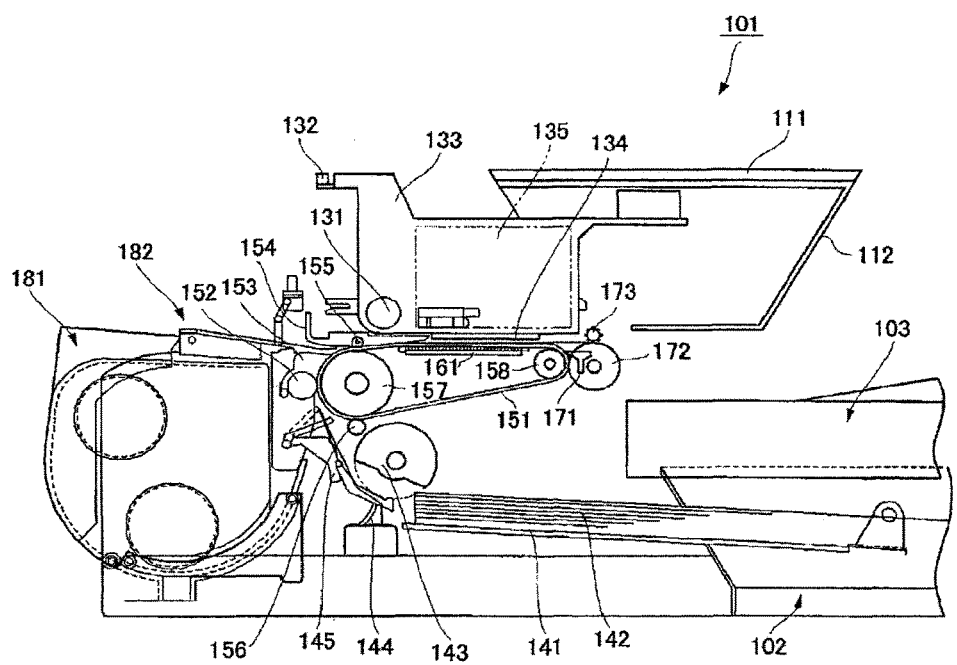
FIG. 4 is a view illustrating an example of an image forming apparatus of the present invention.
Figure 5:
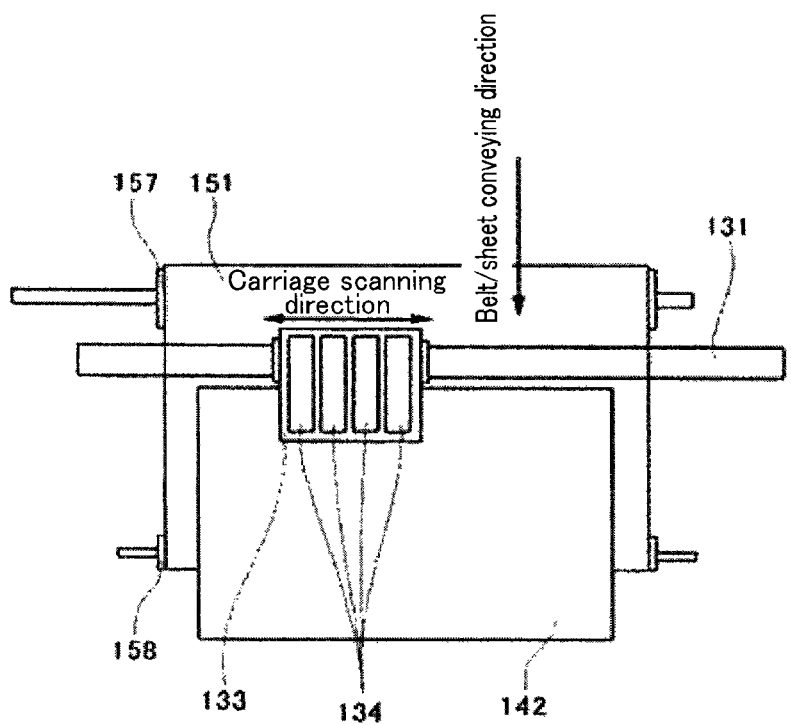
FIG. 5 is a schematic enlarged view illustrating an example of an inkjet head of an image forming apparatus of the present invention.

As illustrated in FIG. 4 and FIG. 5, in the apparatus body 101, a carriage 133 is supported in a manner slidable in a main-scanning direction on a guide rod 131 and a stay 132, which are guide members provided in a lateral bridging manner between unillustrated left and right side panels. The carriage 133 is configured to be moved and scanned in an arrow direction of FIG. 5 by a main scanning motor (unillustrated).

Recording heads 134 including four inkjet recording heads configured to discharge ink droplets of yellow (Y), cyan (C), magenta (M), and black (Bk) colors are attached in the carriage 133 in a manner that a plurality of ink discharging ports are arranged in a direction perpendicular to the main-scanning direction and a direction in which ink droplets are discharged turns downward.

The inkjet recording heads constituting the recording heads 134 may be inkjet recording heads including as a unit configured to generate energy for discharging inks, a piezoelectric actuator such as a piezoelectric element, a thermal actuator using an electro-thermal converting element such as a heating resistor to utilize a phase change upon film boiling of a liquid, a shape memory alloy actuator utilizing a phase change of a metal upon a temperature change, an electrostatic actuator utilizing an electrostatic force, etc.

The carriage 133 is mounted with sub tanks 135 for the colors configured to supply inks of the colors into the recording heads 134. The sub tanks 135 are supplied and replenished with inks from the ink cartridges 200 loaded in the ink cartridge loading portion 104 through unillustrated ink supplying tubes.

A paper feeding unit configured to feed sheets 142 stacked over a paper stacking portion (pressure plate) 141 of the paper feeding tray 102 includes a semicircular roll (paper feeding roll 143) configured to feed the sheets 142 one by one separately from the paper stacking portion 141, and a separation pad 144 disposed counter to the paper feeding roll 143 and made of a material having a high friction coefficient. The separation pad 144 is biased toward the paper feeding roll 143.

A conveying unit configured to convey a sheet 142 fed from the paper feeding unit below the recording heads 134 includes a conveying belt 151 configured to electrostatically attract and convey the sheet 142, a counter roller 152 configured to convey the sheet 142 brought from the paper feeding unit through a guide 145 while nipping the sheet 142 between the conveying belt 151 and the counter roller 152, a conveying guide 153 configured to make the sheet, which is brought approximately vertically upward, change course by about 90° and follow the conveying belt 151, and a leading end pressing roll 155 biased toward the conveying belt 151 by a holding member 154. There is also provided a charging roller 156, which is a charging unit configured to charge a surface of the conveying belt 151.

The conveying belt 151 is an endless belt, is tensed between a conveying roller 157 and a tension roller 158, and is rotatable in a belt conveying direction. The conveying belt 151 includes an external layer constituting a sheet attracting surface and made of a resistance-uncontrolled resin material having a thickness of about 40 μm such as a tetrafluoroethylene-ethylene copolymer (ETFE), and a back layer (an intermediate resistance layer or an earth layer) made of the same material as the external layer and subjected to resistance control with carbon. A guide member 161 is disposed at the back side of the conveying belt 151 at a position corresponding to a printing region of the recording heads 134. A paper ejecting unit configured to eject a sheet 142 recorded by the recording heads 134 includes a separation claw 171 configured to separate the sheet 142 from the conveying belt 151, a paper ejecting roller 172, and a paper ejecting roll 173. The paper ejecting tray 103 is disposed below the paper ejecting roller 172.

A both-side paper feeding unit 181 is attached on a rear surface of the apparatus body 101 in an attachable/detachable manner. The both-side paper feeding unit 181 is configured to take in a sheet 142 that is returned by means of reverse rotation of the conveying belt 151, overturn the sheet 142, and feed the sheet 142 to between the counter roller 152 and the conveying belt 151 again. A manual paper feeding unit 182 is provided over a top surface of the both-side paper feeding unit 181.

In the image forming apparatus described above, each sheet 142 is fed from the paper feeding unit one by one separately, fed approximately vertically upward, guided by the guide 145, and conveyed while being nipped between the conveying belt 151 and the counter roller 152. Furthermore, the leading end of the sheet 142 is guided by the conveying guide 153 and pressed onto the conveying belt 151 by the leading end pressing roll 155, such that the conveying course of the sheet 142 is changed by about 90°.

Here, because the conveying belt 151 is charged by the charging roller 156, the sheet 142 is conveyed by the conveying belt 151 while being electrostatically attracted to the conveying belt 151. Then, by the carriage 133 being moved, the recording heads 134 are driven according to an image signal to discharge ink droplets and record one line over the sheet 142 that is being stopped. Then, the sheet 142 is conveyed by a predetermined amount, and the next line is recorded over the sheet 142. Upon reception of a recording completion signal or a signal indicative of arrival of the trailing end of the sheet 142 at the recording region, the recording operation is completed and the sheet 142 is ejected onto the paper ejecting tray 103.

When a near-end of the amount of inks remaining in the sub tanks 135 is sensed, inks are replenished in a predetermined amount into the sub tanks 135 from the ink cartridges 200.

In the image forming apparatus, when the inks in the ink cartridges 200 are used up, the casings of the ink cartridges 200 can be disassembled and the ink bags put inside can only be exchanged. The ink cartridges 200 can supply inks stably even when the ink cartridges 200 are installed upright at a front loading position. Therefore, even when the apparatus body 101 is set in a state of being blocked overhead, for example, when the apparatus body 101 is stored in a rack or when a thing is placed on top of the apparatus body 101, it is possible to exchange the ink cartridges 200 easily.

An example in which the present invention is applied to a serial-type (shuttle-type) image forming apparatus including a scanning carriage has been described above. However, the present invention can also be applied to a line-type image forming apparatus equipped with a line-type head.

The image forming apparatus and image forming method of the present invention can be applied to various types of recording according to an inkjet recording method. For example, the image forming apparatus and image forming method of the present invention can be particularly favorably applied to inkjet recording printers, facsimile apparatuses, copier apparatuses, and printer/facsimile/copier multifunction peripherals.

(Image Formed Matter)

An image formed matter of the present invention includes a recording medium and an image formed over the recording medium with the ink of the present invention.

<Recording Medium>

The recording medium is not particularly limited and may be appropriately selected depending on the intended purpose. Examples of the recording medium include plain paper, gloss paper, special paper, cloth, films, OHP sheets, and general-purpose printing paper.

The image formed matter has high image qualities with no bleeding, has an excellent temporal stability, and can be favorably used for various purposes as a handout over which various types of printing or images are recorded, etc.

Among the recording media, preferable is general-purpose printing paper having a liquid absorbing property in a predetermined range because an image excellent in image qualities (image density, saturation, beading, and color bleeding), having a high gloss, and also excellent in a smear fixing property can be recorded. Specifically, preferable is a recording medium that includes a support and a coating layer provided over at least one surface of the support, and in which an amount of pure water transferred into the surface over which the coating layer is provided as measured with a dynamic scanning absorptometer is preferably greater than or equal to 2 ml/m$^2$ but less than or equal to 35 ml/m$^2$ in a contact time of 100 ms and is greater than or equal to 3 ml/m$^2$ but less than or equal to 40 ml/m$^2$ in a contact time of 400 ms.

Even the ink described above may cause beading (a phenomenon that adjacent dots attract each other to make the image feel bumpy) and color bleeding (bleeding between different colors) over a recording medium into which an excessively low amount of pure water can be transferred, and may be recorded in an ink dot diameter smaller than a desired diameter and fail to fill a solid image over a recording medium into which an excessively high amount of pure water can be transferred.

Here, the dynamic scanning absorptometer (DSA, Kuga, Shigenori. *JAPAN TAPPI JOURNAL*, Vol. 48, May 1994, pp. 88-92) is an instrument capable of accurately measuring an amount of liquid absorbed in a very short time. The dynamic scanning absorptometer performs automatic measurement in a manner (i) of directly reading a liquid absorbing speed from a move of a meniscus in a capillary or in a manner (ii) of scanning a liquid absorbing head helically over a sample put in a discus shape and automatically changing a scanning speed according to a previously set pattern to measure one sample a number of times corresponding to a number of points needed. A head configured to supply a liquid onto a paper sample is coupled to the capillary through a TEFLON (registered trademark) tube, and the position of the meniscus in the capillary is automatically read with an optical sensor. Specifically, an amount of pure water transferred is measured with a dynamic scanning absorptometer (K350 SERIES D TYPE available from Kyowa Co., Ltd.). An amount of transfer in a contact time of 100 ms can be obtained by interpolation between measured values of the amount of transfer in contact times close to that contact time.

The general-purpose printing paper having a liquid absorbing property in a predetermined range may be a commercially available product. Examples of the commercially available product include: POD GLOSS COAT, OK TOP COAT+, OK KANEFUJI+, and SA KANEFUJI+ (available from Oji Paper Co., Ltd.); SUPER MI DULL, AURORA COAT, and SPACE DX (available from Nippon Paper Industries Co., Ltd.); α MATTE and MU COAT (available from Hokuetsu Paper Co., Ltd.); RAICHOU ART and RAICHOU SUPER ART (available from Chuetsu Pulp & Paper Co., Ltd.); and PEARL COAT N (available from Mitsubishi Paper Mills Limited).

EXAMPLES

The present invention will be described below by way of Examples. However, the present invention should not be construed as being limited to the Examples.

Preparation Example 1

—Preparation of Surface-Reformed Black Pigment Dispersion (1)—

BLACK PEARLS (registered trademark) 1000 (100 g) available from Cabot Corporation (carbon black having a BET specific surface area of 343 $m^2/g$ and containing DBPA in an amount of 105 mL/100 g), sulfanilic acid (100 mmol), and ion-exchanged highly pure water (1 L) were mixed under a room temperature environment with a SILVERSON mixer (6,000 rpm).

When a resultant slurry had a pH of higher than 4, nitric acid (100 mmol) was added to the slurry. Thirty minutes later, sodium nitrite (100 mmol) dissolved in a small amount of ion-exchanged highly pure water was slowly added into the mixture. The mixture was heated to 60° C. while being stirred and was reacted for 1 hour. As a result, a reformed pigment in which the sulfanilic acid was added to the carbon black was produced.

Then, the reformed pigment was adjusted to a pH of 9 with a 10% by mass tetrabutylammonium hydroxide solution (methanol solution). This resulted in a reformed pigment dispersion in 30 minutes.

Then, the obtained dispersion containing the pigment bound to at least one sulfanilic acid group or sulfanilic acid tetrabutylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A surface treatment level of the obtained reformed pigment dispersion was 0.75 mmol/g, and a volume average particle diameter of the obtained reformed pigment dispersion measured with a particle size distribution measuring instrument (NANOTRAC UPA-EX150 available from Nikkiso Co., Ltd.) was 120 nm.

Preparation Example 2

—Preparation of Surface-Reformed Black Pigment Dispersion (2)—

A PROCESSALL 4HV mixer (4 L) was loaded with BLACK PEARLS (registered trademark) 880 available from Cabot Corporation (carbon black having a BET specific surface area of 220 $m^2/g$ and containing DBPA in an amount of 105 mL/100 g) (500 g), ion-exchanged highly pure water (1 L), and 4-aminobenzoic acid (1 mol). Then, the mixture was strongly mixed at 300 rpm for 10 minutes while being heated to 60° C. A 20% by mass sodium nitrite aqueous solution [in an amount equivalent to 1 mol of the 4-aminobenzoic acid] was added to the mixture in 15 minutes. The resultant was mixed and stirred for 3 hours while being heated to 60° C. The resultant reaction product was extracted through dilution with ion-exchanged highly pure water (750 mL).

Then, the resultant was adjusted to a pH of 9 with a 10% by mass tetrabutylammonium hydroxide solution (methanol solution). This resulted in a reformed pigment dispersion in 30 minutes.

Then, the obtained reformed pigment dispersion containing the pigment bound to at least one aminobenzoic acid group or aminobenzoic acid tetrabutylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A surface treatment level of the obtained dispersion was 0.5 mmol/g, and a volume average particle diameter of the obtained dispersion measured with a particle size distribution measuring instrument (NANOTRAC UPA-EX150 available from Nikkiso Co., Ltd.) was 104 nm.

Preparation Example 3

—Preparation of Surface-Reformed Black Pigment Dispersion (3)—

A PROCESSALL 4HV mixer (4 L) was loaded with BLACK PEARLS (registered trademark) 880 (500 g) available from Cabot Corporation (carbon black having a BET specific surface area of 220 $m^2/g$ and containing DBPA in an amount of 105 mL/100 g), ion-exchanged highly pure water (1 L), and 4-aminobenzoic acid (175 mmol). Then, the mixture was strongly mixed at 300 rpm for 10 minutes while being heated to 60° C. A 20% by mass sodium nitrite aqueous solution [in an amount equivalent to 175 mmol of the 4-aminobenzoic acid] was added to the mixture in 15 minutes. The resultant was mixed and stirred for 3 hours while being heated to 60° C. The resultant reaction product was extracted through dilution with ion-exchanged highly pure water (750 mL).

Then, the resultant was adjusted to a pH of 9 with a 10% by mass tetraethylammonium hydroxide aqueous solution. This resulted in a reformed pigment dispersion in 30 minutes.

Then, the obtained reformed pigment dispersion containing the pigment bound to at least one aminobenzoic acid group or aminobenzoic acid tetraethylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A surface treatment level of the obtained dispersion was 0.35 mmol/g, and a volume average particle diameter of the obtained dispersion measured with a particle size distribution measuring instrument (NANOTRAC UPA-EX150 available from Nikkiso Co., Ltd.) was 114 nm.

Preparation Example 4

—Preparation of Surface-Reformed Black Pigment Dispersion (4)—

One kilogram of a pigment dispersion containing a self-dispersible carbon black AQUA-BLACK 162 (available from Tokai Carbon Co., Ltd., with a solid content of the pigment of 19.2% by mass) was subjected to acid precipitation with a 0.1 N HCl aqueous solution. Then, the resultant was adjusted to a pH of 9 with a 40% by mass benzyltrimethylammonium hydroxide solution (methanol solution). This resulted in a reformed pigment dispersion in 30 minutes.

Then, the obtained reformed pigment dispersion containing the pigment bound to at least one carboxylic acid group or carboxylic acid benzyltrimethylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 100 nm.

Preparation Example 5

—Preparation of Surface-Reformed Black Pigment Dispersion (5)—

One kilogram of a pigment dispersion containing SENSIJET BLACK SDP 2000 (available from Sensient Technologies Corporation, with a solid content of the pigment of 14.5% by mass) was subjected to acid precipitation with a OA N HCl aqueous solution. Then, the resultant was adjusted to a pH of 9 with a 10% by mass tetrabutylammonium hydroxide solution (methanol solution). This resulted in a reformed pigment dispersion in 30 minutes.

Then, the obtained reformed pigment dispersion containing the pigment bound to at least one carboxylic acid group, sulfonic acid group, carboxylic acid tetrabutylammonium salt, or sulfonic acid tetrabutylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 120 nm.

Preparation Example 6

—Preparation of Surface-Reformed Magenta Pigment Dispersion (1)—

One kilogram of a pigment dispersion containing SENSIJET SMART MAGENTA 3122 BA (PIGMENT RED 122 surface-treated dispersion available from Sensient Technologies Corporation, with a solid content of the pigment of 14.5% by mass) was subjected to acid precipitation with a 0.1 N HCl aqueous solution. Then, the resultant was adjusted to a pH of 9 with a 10% by mass tetraethylammonium hydroxide aqueous solution. This resulted in a reformed pigment dispersion in 30 minutes.

Then, the obtained reformed pigment dispersion containing the pigment bound to at least one aminobenzoic acid group or aminobenzoic acid tetraethylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 104 nm.

Preparation Example 7

—Preparation of Surface-Reformed Cyan Pigment Dispersion (1)—

One kilogram of a pigment dispersion containing SENSIJET SMART CYAN 3154 BA (PIGMENT BLUE 15:4 surface-treated dispersion available from Sensient Technologies Corporation, with a solid content of the pigment of 14.5% by mass) was subjected to acid precipitation with a 0.1 N HCl aqueous solution. Then, the resultant was adjusted to a pH of 9 with a 40% by mass benzyltrimethylammonium hydroxide solution (methanol solution). This resulted in a reformed pigment dispersion in 30 minutes.

Then, the obtained reformed pigment dispersion containing the pigment bound to at least one aminobenzoic acid group or aminobenzoic acid benzyltrimethylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 116 nm.

Preparation Example 8

—Preparation of Surface-Reformed Yellow Pigment Dispersion (1)—

SENSIJET SMART YELLOW 3074 BA (PIGMENT YELLOW 74 surface-treated dispersion available from Sensient Technologies Corporation, with a solid content of the pigment of 14.5% by mass) was adjusted to a pH of 9 with a 10% by mass tetrabutylammonium hydroxide solution (methanol solution). This resulted in a reformed pigment dispersion in 30 minutes.

Then, the obtained reformed pigment dispersion containing the pigment bound to at least one aminobenzoic acid group or aminobenzoic acid tetrabutylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 145 nm.

Preparation Example 9

<Preparation of Carbon Black Pigment-Containing Polymer Particle Dispersion>
—Preparation of Polymer Solution A—

A 1 L flask equipped with a mechanical stirrer, a thermometer, a nitrogen gas introducing tube, a reflux condenser, and a dropping funnel was sufficiently internally purged with a nitrogen gas. Then, styrene (11.2 g), acrylic acid (2.8 g), lauryl methacrylate (12.0 g), polyethylene glycol methacrylate (4.0 g), a styrene macromer (product name: AS-6 available from Toagosei Co., Ltd.) (4.0 g), and mercaptoethanol (0.4 g) were mixed and heated to 65° C. in the flask.

Then, a mixture solution of styrene (100.8 g), acrylic acid (25.2 g), lauryl methacrylate (108.0 g), polyethylene glycol methacrylate (36.0 g), hydroxyethyl methacrylate (60.0 g), a styrene macromer (product name: AS-6 available from Toagosei Co., Ltd.) (36.0 g), mercaptoethanol (3.6 g), azobis methylvaleronitrile (2.4 g), and methyl ethyl ketone (18 g) was dropped into the flask in 2.5 hours. After the dropping, a mixture solution of azobis methylvaleronitrile (0.8 g) and methyl ethyl ketone (18 g) was dropped into the flask in 0.5 hours. After the resultant was aged at 65° C. for 1 hour, azobis methylvaleronitrile (0.8 g) was added and the resultant was further aged for 1 hour. After the reaction completed, methyl ethyl ketone (364 g) was added into the flask to obtain 800 g of a polymer solution A having a concentration of 50% by mass.

—Preparation of Carbon Black Pigment-Containing Polymer Particle Dispersion—

The polymer solution A (28 g), C.I. Carbon Black (FW100 available from Degussa AG) (42 g), a 1 mol/L potassium hydroxide aqueous solution (13.6 g), methyl ethyl ketone (20 g), and ion-exchanged water (13.6 g) were sufficiently stirred and then kneaded with a roll mill. The obtained paste was put into pure water (200 g), sufficiently stirred, and evacuated of methyl ethyl ketone and water by distillation with an evaporator. Then, to remove coarse particles, the resultant dispersion liquid was subjected to pressure filtration through a polyvinylidene fluoride membrane filter having an average pore diameter of 5.0 μn, to obtain a carbon black pigment-containing polymer particle dispersion liquid in which a solid content of the pigment was 15% by mass and a solid content concentration was 20% by mass.

A volume average particle diameter of polymer particles in the obtained carbon black pigment-containing polymer particle dispersion liquid measured with a particle size distribution measuring instrument (NANOTRAC UPA-EX150 available from Nikkiso Co., Ltd.) was 104 nm.

Preparation Example 10

—Preparation of Surface-Reformed Black Pigment Dispersion (6)—

One kilogram of a pigment dispersion containing COJ 400 (available from Cabot Corporation, with a solid content of the pigment of 15% by mass) was subjected to acid precipitation with a 0.1 N HCl aqueous solution. Then, the resultant was adjusted to a pH of 9 with a 10% by mass tetrabutylammonium hydroxide solution (methanol solution). This resulted in a reformed pigment dispersion in 30 minutes.

Then, the obtained reformed pigment dispersion containing the pigment bound to at least one carboxylic acid group, sulfonic acid group, carboxylic acid tetrabutylammonium salt, or sulfonic acid tetrabutylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 105 nm.

Preparation Example 11

—Preparation of Surface-Reformed Magenta Pigment Dispersion (2)—

Point five kilograms of a pigment dispersion containing COJ 465 M (available from Cabot Corporation, with a solid content of the pigment of 15% by mass) and 0.5 kg of a pigment dispersion containing COJ 480 V (available from Cabot Corporation, with a solid content of the pigment of 15% by mass) were subjected to acid precipitation with a 0.1 N HCl aqueous solution. Then, the resultant was adjusted to a pH of 9 with a 10% by mass tetraethylammonium hydroxide aqueous solution. This resulted in a reformed pigment dispersion in 30 minutes.

Then, the obtained reformed pigment dispersion containing the pigments bound to at least one aminobenzoic acid group or aminobenzoic acid tetraethylammonium salt and ion-exchanged highly pure water were subjected to ultrafiltration through a dialysis membrane and then subjected to ultrasonic dispersion to obtain a reformed pigment dispersion in which a solid content of the pigments was condensed to 20% by mass.

A volume average particle diameter of the obtained dispersion measured with a particle size distribution measuring instrument (NANOTRAC UPA-EX150 available from Nikkiso Co., Ltd.) was 100 nm.

Preparation Example 12

—Preparation of Surface-Reformed Cyan Pigment Dispersion (2)—

One kilogram of a pigment dispersion containing COJ 450 C (available from Cabot Corporation, with a solid content of the pigment of 15% by mass) was subjected to acid precipitation with a 0.1 N HCl aqueous solution. Then, the resultant was adjusted to a pH of 9 with a 40% by mass benzyltrimethylammonium hydroxide solution (methanol solution). This resulted in a reformed pigment dispersion in 30 minutes.

Then, the obtained reformed pigment dispersion containing the pigment bound to at least one aminobenzoic acid group or aminobenzoic acid benzyltrimethylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 111 nm.

Preparation Example 13

—Preparation of Surface-Reformed Yellow Pigment Dispersion (2)—

One kilogram of a pigment dispersion containing COJ 470 Y (available from Cabot Corporation, with a solid content of the pigment of 15% by mass) was subjected to acid precipitation with a 0.1 N HCl aqueous solution. Then, the resultant was adjusted to a pH of 9 with a 40% by mass benzyltrimethylammonium hydroxide solution (methanol solution). This resulted in a reformed pigment dispersion in 30 minutes.

Then, the obtained reformed pigment dispersion containing the pigment bound to at least one aminobenzoic acid group or aminobenzoic acid benzyltrimethylammonium salt and ion-exchanged highly pure water were subjected to ultrafiltration through a dialysis membrane and then subjected to ultrasonic dispersion to obtain a reformed pigment dispersion in which a solid content of the pigment was condensed to 20% by mass.

A volume average particle diameter of the obtained dispersion measured with a particle size distribution measuring instrument (NANOTRAC UPA-EX150 available from Nikkiso Co., Ltd.) was 130 nm.

Production Example 1

—Preparation of Acrylic-Silicone Polymer Particle Dispersion—

A 1 L flask equipped with a mechanical stirrer, a thermometer, a nitrogen gas introducing tube, a reflux condenser, and a dropping funnel was sufficiently internally purged with a nitrogen gas. Then, a reactive anionic surfactant (LATEMUL S-180 available from Kao Corporation)

(8.0 g) and ion-exchanged water (350 g) were added and mixed, and heated to 65° C. in the flask. After the heating, t-butyl peroxobenzoate as a reaction initiator (3.0 g) and sodium isoascorbate (1.0 g) were added to the flask. Five minutes later, a mixture of methyl methacrylate (45 g), 2 ethylhexyl methacrylate (160 g), acrylic acid (5 g), butyl methacrylate (45 g), cyclohexyl methacrylate (30 g), vinyltriethoxysilane (15 g), a reactive anionic surfactant (LATEMUL S-180 available from Kao Corporation) (8.0 g), and ion-exchanged water (340 g) was dropped into the flask in 3 hours.

Then, the resultant was heated and aged at 80° C. for 2 hours, cooled to normal temperature, and adjusted to a pH in a range of from 7 through 8 with sodium hydroxide.

Then, the resultant was evacuated of ethanol by distillation with an evaporator and subjected to water adjustment to produce 730 g of a polymer particle dispersion of Production Example 1 with a solid content of 40% by mass.

A volume average particle diameter of the obtained polymer particle dispersion measured with a particle size distribution measuring instrument (NANOTRAC UPA-EX150 available from Nikkiso Co., Ltd.) was 125 nm.

Example 1

<Preparation of Ink>

3-n-Butoxy-N,N-dimethylpropaneamide represented by the structural formula (1) (20.00 parts by mass), 1,2-propanediol (25.00 parts by mass), 2,2,4-trimethyl-1,3-pentanediol (2.00 parts by mass), a polyether-modified siloxane compound represented by the structural formula (VII) (1.00 part by mass), and 2,4,7,9-tetramethyldecane-4,7-diol (0.50 parts by mass) were put in a container equipped with a stirrer and stirred for 30 minutes to a uniform state.

Then, a fungicide (PROXEL GXL available from Avecia Inc.) (0.05 parts by mass), 2-amino-2-ethyl-1,3-propanediol (0.20 parts by mass), the surface-reformed black pigment dispersion 1 of Preparation Example 1 (37.50 parts by mass), and pure water (balance) were added to the container to total to 100 parts by mass, and the resultant was stirred for 60 minutes to make a uniform ink.

The obtained ink was subjected to pressure filtration through a polyvinylidene fluoride membrane filter having an average pore diameter of 1.2 μm to remove coarse particles and dusts, to produce an ink of Example 1.

Example 2

3-Ethyl-3-hydroxymethyloxetane represented by the structural formula (4) (40 parts by mass), 2,2,4-trimethyl-1,3-pentanediol (2 parts by mass), a polyether-modified siloxane compound represented by the structural formula (IX) (2 parts by mass), and 2,4,7,9-tetramethyldecane-4,7-diol (0.5 parts by mass) were put in a container equipped with a stirrer and stirred for 30 minutes to a uniform state.

Then, a fungicide (PROXEL GXL available from Avecia Inc.) (0.05 parts by mass), 2-amino-2-ethyl-1,3-propanediol (0.2 parts by mass), the surface-reformed black pigment dispersion 1 of Preparation Example 1 (37.5 parts by mass), and pure water (balance) were added to the container, and the resultant was stirred for 60 minutes to a uniform state.

Then, the acrylic-silicone polymer particle dispersion of Production Example 1 (5 parts by mass) was added to the container, and the resultant was stirred for 30 minutes to make a uniform ink.

The obtained ink was subjected to pressure filtration through a polyvinylidene fluoride membrane filter having an average pore diameter of 1.2 μm to remove coarse particles and dusts, to produce an ink of Example 2.

Examples 3 to 19 and Comparative Examples 1 to 8

In the same manner as in Example 1 or Example 2, an organic solvent, a surfactant, and a defoamer presented in Table 1 to Table 6 below were mixed and stirred. Then, a fungicide, a pH adjuster, and a water-dispersible colorant (pigment dispersion) were mixed, and the resultant was stirred. Then, as needed, a water-dispersible resin was mixed, and the resultant was stirred to make a uniform ink.

The obtained ink was subjected to pressure filtration through a polyvinylidene fluoride membrane filter having an average pore diameter of 1.2 μm to remove coarse particles and dusts, to produce inks of Examples 3 to 19 and Comparative Examples 1 to 8.

TABLE 1

| | | Examples | | | | |
|---|---|---|---|---|---|---|
| Component (% by mass) | | 1 | 2 | 3 | 4 | 5 |
| Water-dispersible colorant (pigment dispersion) | Surface-reformed black pigment dispersion 1 (Preparation Example 1) | 37.50 | 37.50 | — | — | — |
| | Surface-reformed black pigment dispersion 2 (Preparation Example 2) | — | — | 37.50 | — | — |
| | Surface-reformed black pigment dispersion 3 (Preparation Example 3) | — | — | — | 35.00 | — |
| | Surface-reformed black pigment dispersion 4 (Preparation Example 4) | — | — | — | — | 37.50 |
| | Surface-reformed black pigment dispersion 5 (Preparation Example 5) | — | — | — | — | — |
| | Surface-reformed magenta pigment dispersion 1 (Preparation Example 6) | — | — | — | — | — |
| | Surface-reformed cyan pigment dispersion 1 (Preparation Example 7) | — | — | — | — | — |
| | Surface-reformed yellow pigment dispersion 1 (Preparation Example 8) | — | — | — | — | — |
| | SENSIJET SMART MAGENTA 3122BA (aminobenzoic acid Na salt) | — | — | — | — | — |
| | SENSIJET SMART CYAN 3154BA (aminobenzoic acid Na salt) | — | — | — | — | — |
| | SENSIJET SMART YELLOW 3074BA (aminobenzoic acid Na salt) | — | — | — | — | — |
| | SENSIJET BLACK SDP2000 (carboxylic Na salt, sulfonic acid Na salt) | — | — | — | — | — |
| | Carbon black pigment-containing polymer particle dispersion (Preparation Example 9) | — | — | — | — | — |
| | Surface-reformed black pigment dispersion 6 (Preparation Example 10) | — | — | — | — | — |
| | Surface-reformed magenta pigment dispersion 2 (Preparation Example 11) | — | — | — | — | — |
| | Surface-reformed cyan pigment dispersion 2 (Preparation Example 12) | — | — | — | — | — |
| | Surface-reformed yellow pigment dispersion 2 (Preparation Example 13) | — | — | — | — | — |

TABLE 1-continued

| | | Component (% by mass) | Examples 1 | 2 | 3 | 4 | 5 |
|---|---|---|---|---|---|---|---|
| Water-dispersible resin | | Acrylic-silicone polymer particle dispersion | — | 5.00 | — | 5.00 | 5.00 |
| | | Fluorine-based resin emulsion | — | — | 4.00 | — | — |
| Organic solvent | Organic solvent | Structural formula (1): 3-n-butoxy-N,N-dimethylpropaneamide (SP: 9.03) | 20.00 | — | 30.00 | — | — |
| | | Structural formula (4): 3-ethyl-3-hydroxylmethyloxcetane (SP: 11.3) | — | 40.00 | — | 42.00 | 30.00 |
| | | 1,2-butanediol (SP: 12.8) | — | — | 10.00 | — | 5.00 |
| | | 1,2-propanediol (SP: 13.5) | 25.00 | — | — | — | 5.00 |
| | Wetting agent | Glycerin (SP: 16.38) | — | — | — | — | — |
| | | Triethylene glycol (SP: 15.4) | — | — | — | — | — |
| | Permeating agent | 2-ethyl-1,3-hexanediol (SP: 10.6) | — | — | 2.00 | 2.00 | 2.00 |
| | | 2,2,4-trimehtyl-1,3-pentanediol (SP: 10.8) | 2.00 | 2.00 | — | — | — |
| Surfactant | | Structural formula (VII): polyether-modified siloxane compound | 1.00 | — | — | — | — |
| | | Structural formula (IX): polyether-modified siloxane compound | — | 2.00 | — | — | — |
| | | Structural formula (X): polyether-modified siloxane compound | — | — | 2.00 | — | — |
| | | TEGO WET 270 | — | — | — | 2.00 | — |
| | | SILFACE SAG503A | — | — | — | — | 1.00 |
| | | UNIDYNE DSN403N | — | — | — | — | — |
| | | ZONYL FS-300 | — | — | — | — | — |
| | | SURFYNOL 104E | — | — | — | — | — |
| | | SOFTANOL EP-7025 | — | — | — | — | — |
| Fungicide | | PROXEL GXL | 0.05 | 0.05 | 0.05 | 0.05 | 0.05 |
| Foam inhibitor (defoamer) | | 2,4,7,9-tetramethyldecane-4,7-diol | 0.50 | 0.50 | — | — | 0.40 |
| | | 2,5,8,11-tetramethyldecane-5,8-diol | — | — | 0.40 | 0.40 | — |
| pH adjuster | | 2-amino-2-ethyl-1,3-propanediol | 0.20 | 0.20 | 0.20 | 0.10 | 0.10 |
| | | Pure water | Balance | Balance | Balance | Balance | Balance |
| | | Total (% by mass) | 100 | 100 | 100 | 100 | 100 |

TABLE 2

| | Component (% by mass) | Examples 6 | 7 | 8 | 9 | 10 |
|---|---|---|---|---|---|---|
| Water-dispersible colorant (pigment dispersion) | Surface-reformed black pigment dispersion 1 (Preparation Example 1) | — | — | — | — | — |
| | Surface-reformed black pigment dispersion 2 (Preparation Example 2) | — | — | — | — | — |
| | Surface-reformed black pigment dispersion 3 (Preparation Example 3) | — | — | — | — | — |
| | Surface-reformed black pigment dispersion 4 (Preparation Example 4) | — | — | — | — | — |
| | Surface-reformed black pigment dispersion 5 (Preparation Example 5) | 37.50 | — | — | — | — |
| | Surface-reformed magenta pigment dispersion 1 (Preparation Example 6) | — | 35.00 | — | — | — |
| | Surface-reformed cyan pigment dispersion 1 (Preparation Example 7) | — | — | 22.50 | — | 22.50 |
| | Surface-reformed yellow pigment dispersion 1 (Preparation Example 8) | — | — | — | 22.50 | — |
| | SENSIJET SMART MAGENTA 3122BA (aminobenzoic acid Na salt) | — | — | — | — | — |
| | SENSIJET SMART CYAN 3154BA (aminobenzoic acid Na salt) | — | — | — | — | — |
| | SENSIJET SMART YELLOW 3074BA (aminobenzoic acid Na salt) | — | — | — | — | — |
| | SENSIJET BLACK SDP2000 (carboxylic Na salt, sulfonic acid Na salt) | — | — | — | — | — |
| | Carbon black pigment-containing polymer particle dispersion (Preparation Example 9) | — | — | — | — | — |
| | Surface-reformed black pigment dispersion 6 (Preparation Example 10) | — | — | — | — | — |
| | Surface-reformed magenta pigment dispersion 2 (Preparation Example 11) | — | — | — | — | — |
| | Surface-reformed cyan pigment dispersion 2 (Preparation Example 12) | — | — | — | — | — |
| | Surface-reformed yellow pigment dispersion 2 (Preparation Example 13) | — | — | — | — | — |
| Water-dispersible resin | Acrylic-silicone polymer particle dispersion | 5.00 | 5.00 | 5.00 | 5.00 | 5.00 |
| | Fluorine-based resin emulsion | — | — | — | — | — |
| Organic solvent | Organic solvent — Structural formula (1): 3-n-butoxy-N,N-dimethylpropaneamide (SP: 9.03) | 30.00 | — | — | — | 39.00 |
| | Structural formula (4): 3-ethyl-3-hydroxylmethyloxcetane (SP: 11.3) | — | 39.00 | 49.00 | 52.50 | — |
| | 1,2-butanediol (SP: 12.8) | — | — | — | — | — |
| | 1,2-propanediol (SP: 13.5) | 10.00 | — | — | — | 10.00 |
| Wetting agent | Glycerin (SP: 16.38) | — | — | — | — | — |
| | Triethylene glycol (SP: 15.4) | — | — | — | — | — |
| Permeating agent | 2-ethyl-1,3-hexanediol (SP: 10.6) | 1.00 | 2.00 | 2.00 | 2.00 | 2.00 |
| | 2,2,4-trimehtyl-1,3-pentanediol (SP: 10.8) | — | — | — | — | — |
| Surfactant | Structural formula (VII): polyether-modified siloxane compound | — | 2.00 | — | — | — |
| | Structural formula (IX): polyether-modified siloxane compound | — | — | 2.00 | — | — |
| | Structural formula (X): polyether-modified siloxane compound | — | — | — | 3.00 | — |
| | TEGO WET 270 | 3.00 | — | — | — | — |
| | SILFACE SAG503A | — | — | — | — | 2.00 |
| | UNIDYNE DSN403N | — | — | — | — | — |
| | ZONYL FS-300 | — | — | — | — | — |
| | SURFYNOL 104E | — | — | — | — | — |
| | SOFTANOL EP-7025 | — | — | — | — | — |

TABLE 2-continued

|  | Component (% by mass) | Examples | | | | |
|---|---|---|---|---|---|---|
|  |  | 6 | 7 | 8 | 9 | 10 |
| Fungicide | PROXEL GXL | 0.05 | 0.05 | 0.05 | 0.05 | 0.05 |
| Foam inhibitor | 2,4,7,9-tetramethyldecane-4,7-diol | 0.40 | 0.40 | 0.40 | 0.40 | 0.40 |
| (defoamer) | 2,5,8,11-tetramethyldecane-5,8-diol | — | — | — | — | — |
| pH adjuster | 2-amino-2-ethyl-1,3-propanediol | 0.20 | 0.20 | 0.20 | 0.20 | 0.20 |
|  | Pure water | Balance | Balance | Balance | Balance | Balance |
|  | Total (% by mass) | 100 | 100 | 100 | 100 | 100 |

TABLE 3

|  |  | Component (% by mass) | Examples | | | | |
|---|---|---|---|---|---|---|---|
|  |  |  | 11 | 12 | 13 | 14 | 15 |
| Water-dispersible colorant (pigment dispersion) | | Surface-reformed black pigment dispersion 1 (Preparation Example 1) | — | — | — | — | — |
| | | Surface-reformed black pigment dispersion 2 (Preparation Example 2) | — | — | — | — | — |
| | | Surface-reformed black pigment dispersion 3 (Preparation Example 3) | — | — | — | — | — |
| | | Surface-reformed black pigment dispersion 4 (Preparation Example 4) | — | — | — | — | — |
| | | Surface-reformed black pigment dispersion 5 (Preparation Example 5) | — | — | — | — | — |
| | | Surface-reformed magenta pigment dispersion 1 (Preparation Example 6) | — | — | — | — | — |
| | | Surface-reformed cyan pigment dispersion 1 (Preparation Example 7) | — | — | — | — | — |
| | | Surface-reformed yellow pigment dispersion 1 (Preparation Example 8) | — | — | — | — | — |
| | | SENSIJET SMART MAGENTA 3122BA (aminobenzoic acid Na salt) | — | — | 35.00 | — | — |
| | | SENSIJET SMART CYAN 3154BA (aminobenzoic acid Na salt) | — | — | — | 22.50 | — |
| | | SENSIJET SMART YELLOW 3074BA (aminobenzoic acid Na salt) | — | — | — | — | 22.50 |
| | | SENSIJET BLACK SDP2000 (carboxylic Na salt, sulfonic acid Na salt) | — | 48.28 | — | — | — |
| | | Carbon black pigment-containing polymer particle dispersion (Preparation Example 9) | 46.67 | — | — | — | — |
| | | Surface-reformed black pigment dispersion 6 (Preparation Example 10) | — | — | — | — | — |
| | | Surface-reformed magenta pigment dispersion 2 (Preparation Example 11) | — | — | — | — | — |
| | | Surface-reformed cyan pigment dispersion 2 (Preparation Example 12) | — | — | — | — | — |
| | | Surface-reformed yellow pigment dispersion 2 (Preparation Example 13) | — | — | — | — | — |
| Water-dispersible resin | | Acrylic-silicone polymer particle dispersion | — | 5.00 | 5.00 | 5.00 | 5.00 |
| | | Fluorine-based resin emulsion | — | — | — | — | — |
| Organic solvent | Organic solvent | Structural formula (1): 3-n-butoxy-N,N-dimethylpropaneamide (SP: 9.03) | — | — | — | — | — |
| | | Structural formula (4): 3-ethyl-3-hydroxylmethyloxcetane (SP: 11.3) | 42.00 | 42.00 | 39.00 | 49.00 | 52.50 |
| | | 1,2-butanediol (SP: 12.8) | — | — | — | — | — |
| | | 1,2-propanediol (SP: 13.5) | — | — | — | — | — |
| | Wetting agent | Glycerin (SP: 16.38) | — | — | — | — | — |
| | | Triethylene glycol (SP: 15.4) | — | — | — | — | — |
| | Permeating agent | 2-ethyl-1,3-hexanediol (SP: 10.6) | 2.00 | 2.00 | 2.00 | 2.00 | 2.00 |
| | | 2,2,4-trimehtyl-1,3-pentanediol (SP: 10.8) | — | — | — | — | — |
| Surfactant | | Structural formula (VII): polyether-modified siloxane compound | — | — | 2.00 | — | — |
| | | Structural formula (IX): polyether-modified siloxane compound | — | — | — | 2.00 | — |
| | | Structural formula (X): polyether-modified siloxane compound | — | — | — | — | 3.00 |
| | | TEGO WET 270 | 2.00 | 2.00 | — | — | — |
| | | SILFACE SAG503A | — | — | — | — | — |
| | | UNIDYNE DSN403N | — | — | — | — | — |
| | | ZONYL FS-300 | — | — | — | — | — |
| | | SURFYNOL 104E | — | — | — | — | — |
| | | SOFTANOL EP-7025 | — | — | — | — | — |
| Fungicide | | PROXEL GXL | 0.05 | 0.05 | 0.05 | 0.05 | 0.05 |
| Foam inhibitor | | 2,4,7,9-tetramethyldecane-4,7-diol | — | — | 0.40 | 0.40 | 0.40 |
| (defoamer) | | 2,5,8,11-tetramethylde cane-5,8-diol | 0.40 | 0.40 | — | — | — |
| pH adjuster | | 2-amino-2-ethyl-1,3-propanediol | 0.10 | 0.10 | 0.20 | 0.20 | 0.20 |
| | | Pure water | Balance | Balance | Balance | Balance | Balance |
| | | Total (% by mass) | 100 | 100 | 100 | 100 | 100 |

TABLE 4

|  | Component (% by mass) | Examples | | | |
|---|---|---|---|---|---|
|  |  | 16 | 17 | 18 | 19 |
| Water-dispersible colorant (pigment dispersion) | Surface-reformed black pigment dispersion 1 (Preparation Example 1) | — | — | — | — |
| | Surface-reformed black pigment dispersion 2 (Preparation Example 2) | — | — | — | — |
| | Surface-reformed black pigment dispersion 3 (Preparation Example 3) | — | — | — | — |
| | Surface-reformed black pigment dispersion 4 (Preparation Example 4) | — | — | — | — |
| | Surface-reformed black pigment dispersion 5 (Preparation Example 5) | — | — | — | — |

TABLE 4-continued

|  |  |  | Examples | | | |
|---|---|---|---|---|---|---|
| | | Component (% by mass) | 16 | 17 | 18 | 19 |
| | | Surface-reformed magenta pigment dispersion 1 (Preparation Example 6) | — | — | — | — |
| | | Surface-reformed cyan pigment dispersion 1 (Preparation Example 7) | — | — | — | — |
| | | Surface-reformed yellow pigment dispersion 1 (Preparation Example 8) | — | — | — | — |
| | | SENSIJET SMART MAGENTA 3122BA (aminobenzoic acid Na salt) | — | — | — | — |
| | | SENSIJET SMART CYAN 3154BA (aminobenzoic acid Na salt) | — | — | — | — |
| | | SENSIJET SMART YELLOW 3074BA (aminobenzoic acid Na salt) | — | — | — | — |
| | | SENSIJET BLACK SDP2000 (carboxylic Na salt, sulfonic acid Na salt) | — | — | — | — |
| | | Carbon black pigment-containing polymer particle dispersion (Preparation Example 9) | — | — | — | — |
| | | Surface-reformed black pigment dispersion 6 (Preparation Example 10) | 37.50 | — | — | — |
| | | Surface-reformed magenta pigment dispersion 2 (Preparation Example 11) | — | 35.00 | — | — |
| | | Surface-reformed cyan pigment dispersion 2 (Preparation Example 12) | — | — | 22.50 | — |
| | | Surface-reformed yellow pigment dispersion 2 (Preparation Example 13) | — | — | — | 22.50 |
| Water-dispersible resin | | Acrylic-silicone polymer particle dispersion | 5.00 | 5.00 | 5.00 | 5.00 |
| | | Fluorine-based resin emulsion | — | — | — | — |
| Organic solvent | Organic solvent | Structural formula (1): 3-n-butoxy-N,N-dimethylpropaneamide (SP: 9.03) | 30.00 | — | — | — |
| | | Structural formula (4): 3-ethyl-3-hydroxylmethyloxcetane (SP: 11.3) | — | 39.00 | 49.00 | 52.50 |
| | | 1,2-butanediol (SP: 12.8) | — | — | — | — |
| | | 1,2-propanediol (SP: 13.5) | 10.00 | — | — | — |
| | Wetting agent | Glycerin (SP: 16.38) | — | — | — | — |
| | | Triethylene glycol (SP: 15.4) | — | — | — | — |
| | Permeating agent | 2-ethyl-1,3-hexanediol (SP: 10.6) | 1.00 | 2.00 | 2.00 | 2.00 |
| | | 2,2,4-trimehtyl-1,3-pentanediol (SP: 10.8) | — | — | — | — |
| Surfactant | | Structural formula (VII): polyether-modified siloxane compound | — | 2.00 | — | — |
| | | Structural formula (IX): polyether-modified siloxane compound | — | — | 2.00 | — |
| | | Structural formula (X): polyether-modified siloxane compound | — | — | — | 3.00 |
| | | TEGO WET 270 | 3.00 | — | — | — |
| | | SILFACE SAG503A | — | — | — | — |
| | | UNIDYNE DSN403N | — | — | — | — |
| | | ZONYL FS-300 | — | — | — | — |
| | | SURFYNOL 104E | — | — | — | — |
| | | SOFTANOL EP-7025 | — | — | — | — |
| Fungicide | | PROXEL GXL | 0.05 | 0.05 | 0.05 | 0.05 |
| Foam inhibitor (defoamer) | | 2,4,7,9-tetramethyldecane-4,7-diol | 0.40 | 0.40 | 0.40 | 0.40 |
| | | 2,5,8,11-tetramethyldecane-5,8-diol | — | — | — | — |
| pH adjuster | | 2-amino-2-ethyl-1,3-propanediol | 0.20 | 0.20 | 0.20 | 0.20 |
| | | Pure water | Balance | Balance | Balance | Balance |
| | | Total (% by mass) | 100 | 100 | 100 | 100 |

TABLE 5

|  |  | Comparative Examples | | | | |
|---|---|---|---|---|---|---|
| | Component (% by mass) | 1 | 2 | 3 | 4 | 5 |
| Water-dispersible colorant (pigment dispersion) | Surface-reformed black pigment dispersion 1 (Preparation Example 1) | — | — | — | — | — |
| | Surface-reformed black pigment dispersion 2 (Preparation Example 2) | — | — | — | — | — |
| | Surface-reformed black pigment dispersion 3 (Preparation Example 3) | — | — | — | — | — |
| | Surface-reformed black pigment dispersion 4 (Preparation Example 4) | — | — | — | — | — |
| | Surface-reformed black pigment dispersion 5 (Preparation Example 5) | — | — | — | — | — |
| | Surface-reformed magenta pigment dispersion 1 (Preparation Example 6) | 35.00 | 35.00 | — | — | — |
| | Surface-reformed cyan pigment dispersion 1 (Preparation Example 7) | — | — | 22.50 | 22.50 | 22.50 |
| | Surface-reformed yellow pigment dispersion 1 (Preparation Example 8) | — | — | — | — | — |
| | SENSIJET SMART MAGENTA 3122BA (aminobenzoic acid Na salt) | — | — | — | — | — |
| | SENSIJET SMART CYAN 3154BA (aminobenzoic acid Na salt) | — | — | — | — | — |
| | SENSIJET SMART YELLOW 3074BA (aminobenzoic acid Na salt) | — | — | — | — | — |
| | SENSIJET BLACK SDP2000 (carboxylic Na salt, sulfonic acid Na salt) | — | — | — | — | — |
| | Carbon black pigment-containing polymer particle dispersion (Preparation Example 9) | — | — | — | — | — |
| | Surface-reformed black pigment dispersion 6 (Preparation Example 10) | — | — | — | — | — |
| | Surface-reformed magenta pigment dispersion 2 (Preparation Example 11) | — | — | — | — | — |
| | Surface-reformed cyan pigment dispersion 2 (Preparation Example 12) | — | — | — | — | — |
| | Surface-reformed yellow pigment dispersion 2 (Preparation Example 13) | — | — | — | — | — |
| Water-dispersible resin | Acrylic-silicone polymer particle dispersion | 5.00 | 5.00 | 5.00 | 5.00 | 5.00 |
| | Fluorine-based resin emulsion | — | — | — | — | — |
| Organic solvent | Organic solvent | Structural formula (1): 3-n-butoxy-N,N-dimethylpropaneamide (SP: 9.03) | 15.00 | — | — | — | — |
| | | Structural formula (4): 3-ethyl-3-hydroxylmethyloxcetane (SP: 11.3) | — | — | 49.00 | 49.00 | 49.00 |
| | | 1,2-butanediol (SP: 12.8) | 5.00 | — | — | — | — |
| | | 1,2-propanediol (SP: 13.5) | — | — | — | — | — |

TABLE 5-continued

|  |  |  | Comparative Examples | | | | |
|---|---|---|---|---|---|---|---|
| Component (% by mass) | | | 1 | 2 | 3 | 4 | 5 |
| | Wetting agent | Glycerin (SP: 16.38) | 22.00 | 30.00 | — | — | — |
| | | Triethylene glycol (SP: 15.4) | — | 12.50 | — | — | — |
| | Permeating agent | 2-ethyl-1,3-hexanediol (SP: 10.6) | 2.00 | 2.00 | 2.00 | 2.00 | 2.00 |
| | | 2,2,4-trimethyl-1,3-pentanediol (SP: 10.8) | — | — | — | — | — |
| Surfactant | | Structural formula (VII): polyether-modified siloxane compound | — | — | — | — | — |
| | | Structural formula (IX): polyether-modified siloxane compound | — | — | 2.00 | 2.00 | 2.00 |
| | | Structural formula (X): polyether-modified siloxane compound | — | — | — | — | — |
| | | TEGO WET 270 | 2.00 | 2.00 | — | — | — |
| | | SILFACE SAG503A | — | — | — | — | — |
| | | UNIDYNE DSN403N | — | — | 2.00 | — | — |
| | | ZONYL FS-300 | — | — | — | 5.00 | — |
| | | SURFYNOL 104E | — | — | — | — | 2.00 |
| | | SOFTANOL EP-7025 | — | — | — | — | — |
| Fungicide | | PROXEL GXL | 0.05 | 0.05 | 0.05 | 0.05 | 0.05 |
| Foam inhibitor (defoamer) | | 2,4,7,9-tetramethyldecane-4,7-diol | 0.40 | 0.40 | 0.40 | 0.40 | 0.40 |
| | | 2,5,8,11-tetramethyldecane-5,8-diol | — | — | — | — | — |
| pH adjuster | | 2-amino-2-ethyl-1,3-propanediol | 0.20 | 0.20 | 0.20 | 0.20 | 0.20 |
| | | Pure water | Balance | Balance | Balance | Balance | Balance |
| | | Total (% by mass) | 100 | 100 | 100 | 100 | 100 |

TABLE 6

|  |  | Comparative Examples | | |
|---|---|---|---|---|
| Component (% by mass) | | 6 | 7 | 8 |
| Water-dispersible colorant (pigment dispersion) | Surface-reformed black pigment dispersion 1 (Preparation Example 1) | — | — | — |
| | Surface-reformed black pigment dispersion 2 (Preparation Example 2) | — | — | — |
| | Surface-reformed black pigment dispersion 3 (Preparation Example 3) | — | 35.00 | — |
| | Surface-reformed black pigment dispersion 4 (Preparation Example 4) | — | — | — |
| | Surface-reformed black pigment dispersion 5 (Preparation Example 5) | — | — | — |
| | Surface-reformed magenta pigment dispersion 1 (Preparation Example 6) | — | — | — |
| | Surface-reformed cyan pigment dispersion 1 (Preparation Example 7) | 22.50 | — | — |
| | Surface-reformed yellow pigment dispersion 1 (Preparation Example 8) | — | — | 22.50 |
| | SENSIJET SMART MAGENTA 3122BA (aminobenzoic acid Na salt) | — | — | — |
| | SENSIJET SMART CYAN 3154BA (aminobenzoic acid Na salt) | — | — | — |
| | SENSIJET SMART YELLOW 3074BA (aminobenzoic acid Na salt) | — | — | — |
| | SENSIJET BLACK SDP2000 (carboxylic Na salt, sulfonic acid Na salt) | — | — | — |
| | Carbon black pigment-containing polymer particle dispersion (Preparation Example 9) | — | — | — |
| | Surface-reformed black pigment dispersion 6 (Preparation Example 10) | — | — | — |
| | Surface-reformed magenta pigment dispersion 2 (Preparation Example 11) | — | — | — |
| | Surface-reformed cyan pigment dispersion 2 (Preparation Example 12) | — | — | — |
| | Surface-reformed yellow pigment dispersion 2 (Preparation Example 13) | — | — | — |
| Water-dispersible resin | Acrylic-silicone polymer particle dispersion | 5.00 | 5.00 | 5.00 |
| | Fluorine-based resin emulsion | — | — | — |
| Organic solvent | Organic solvent | Structural formula (1): 3-n-butoxy-N,N-dimethylpropaneamide (SP: 9.03) | — | — | — |
| | | Structural formula (4): 3-ethyl-3-hydroxylmethyloxcetane (SP: 11.3) | 49.00 | 42.00 | 49.00 |
| | | 1,2-butanediol (SP: 12.8) | — | — | — |
| | | 1,2-propanediol (SP: 13.5) | — | — | — |
| | Wetting agent | Glycerin (SP: 16.38) | — | — | — |
| | | Triethylene glycol (SP: 15.4) | — | — | — |
| | Permeating agent | 2-ethyl-1,3-hexanediol (SP: 10.6) | 2.00 | 2.00 | 2.00 |
| | | 2,2,4-trimehtyl-1,3-pentanediol (SP: 10.8) | — | — | — |
| Surfactant | | Structural formula (VII): polyether-modified siloxane compound | — | — | — |
| | | Structural formula (IX): polyether-modified siloxane compound | 2.00 | — | 2.00 |
| | | Structural formula (X): polyether-modified siloxane compound | — | — | — |
| | | TEGO WET 270 | — | — | — |
| | | SILFACE SAG503A | — | — | — |
| | | UNIDYNE DSN403N | — | 1.00 | — |
| | | ZONYL FS-300 | — | — | — |
| | | SURFYNOL 104E | — | — | 2.00 |
| | | SOFTANOL EP-7025 | 2.00 | — | — |
| Fungicide | | PROXEL GXL | 0.05 | 0.05 | 0.05 |
| Foam inhibitor (defoamer) | | 2,4,7,9-tetramethyldecane-4,7-diol | 0.40 | — | — |
| | | 2,5,8,11-tetramethyldecane-5,8-diol | — | 0.40 | 0.40 |
| pH adjuster | | 2-amino-2-ethyl-1,3-propanediol | 0.20 | 0.10 | 0.10 |
| | | Pure water | Balance | Balance | Balance |
| | | Total (% by mass) | 100 | 100 | 100 |

Abbreviations, etc. in Table 1 to Table 6 represent the meanings below.

SENSIJET SMART MAGENTA 3122BA: available from Sensient Technologies Corporation (a surface-treated pigment dispersion)

SENSIJET SMART CYAN 3154BA: available from Sensient Technologies Corporation (a surface-treated pigment dispersion)

SENSIJET SMART YELLOW 3074BA: available from Sensient Technologies Corporation (a surface-treated pigment dispersion)

SENSIJET BLACK SDP2000: available from Sensient Technologies Corporation (a surface-treated pigment dispersion)

Fluorine-based resin emulsion: available from Asahi Glass Co., Ltd., LUMIFLON FE4300, with a solid content of 50% by mass, an average particle diameter of 150 nm, and MFT of lower than or equal to 30° C.

Organic solvent represented by the structural formula (1) below

[Structural formula (1), SP value: 9.03]

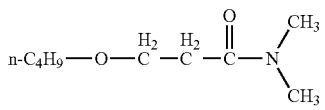

Organic solvent represented by the structural formula (4) below

[Structural formula (4), SP value: 11.3]

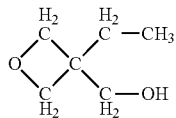

Polyether-modified siloxane compound represented by the structural formula (VII) below

[Structural formula (VII)]

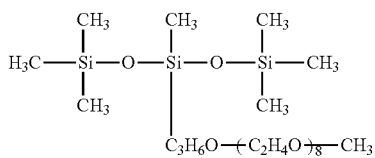

Polyether-modified siloxane compound represented by the structural formula (IX) below

[Structural formula (IX)]

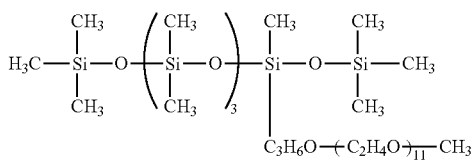

Polyether-modified siloxane compound represented by the structural formula (X) below

[Structural formula (X)]

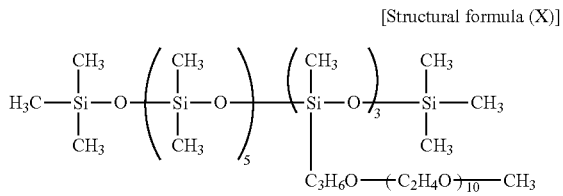

TEGO WET 270: a polyether-modified siloxane compound (available from Evonik Industries AG, with an effective component ratio of 100% by mass)

SILFACE SAG503A: a polyether-modified siloxane compound (available from Nissin Chemical Co., Ltd., with an effective component ratio of 100% by mass)

UNIDYNE DSN403N: polyoxyethylene perfluoroalkylether (available from Daikin Industries, Ltd., with an effective component ratio of 100% by mass)

ZONYL FS-300: polyoxyethylene perfluoroalkylether (available from DuPont Kabushiki Kaisha, with an effective component ratio of 40% by mass)

SURFYNOL 104E: an acetyleneglycol compound (available from Nissin Chemical Co., Ltd., with an effective component ratio of 100% by mass)

SOFTANOL EP-7025: a higher alcohol ethoxylate compound (available from Nippon Shokubai Co., Ltd., with an effective component ratio of 100% by mass)

PROXEL GXL: a fungicide mainly made of 1,2-benzisothiazolin-3-one (available from Avecia Inc., with a component ratio of 20% by mass, containing a dipropylene glycol)

Next, ink properties of the inks of Examples 1 to 19 and Comparative Examples 1 to 8 were measured in the manners described below. The results are presented in Table 7.

<Viscosity Measurement>

A viscosity of the inks was measured with a viscometer (RE-550L available from Told Sangyo Co., Ltd.) at 25° C.

<pH Measurement>

A pH of the inks was measured with a pH meter (HM-30R TYPE available from DKK-TOA Corporation) at 25° C.

<Dynamic Surface Tension Measurement>

As a dynamic surface tension of the inks of the present invention, a dynamic surface tension at a surface lifetime, measured by a maximum foaming pressure method, of 15 msec was measured with SITA_DYNOTESTER (available from SITA Messtechnik GmbH) at 25° C.

<Static Surface Tension>

A static surface tension of the inks was measured with an automatic surface tensiometer (DY-300 available from Kyowa Interface Science Co., Ltd.) at 25° C.

TABLE 7

|  | Ink properties | | | | |
| --- | --- | --- | --- | --- | --- |
|  | Viscosity (mPa·s) | pH | Dynamic surface tension: A (mN/m) at 15 msec | Static surface tension: B (mN/m) | [(A − B)/(A + B)] × 100 |
| Ex. 1 | 8.2 | 9.5 | 33.2 | 24.3 | 15.5% |
| Ex. 2 | 8.5 | 9.6 | 31.7 | 22.9 | 16.1% |
| Ex. 3 | 8.6 | 9.7 | 32.9 | 23.9 | 15.9% |
| Ex. 4 | 8.4 | 9.7 | 29.7 | 22.1 | 14.7% |
| Ex. 5 | 8.0 | 9.4 | 33.3 | 26.8 | 10.8% |
| Ex. 6 | 8.7 | 9.7 | 28.9 | 21.5 | 14.7% |
| Ex. 7 | 8.5 | 9.7 | 32.3 | 22.6 | 17.7% |
| Ex. 8 | 8.2 | 9.5 | 29.0 | 21.6 | 14.6% |
| Ex. 9 | 7.8 | 9.2 | 27.5 | 20.8 | 13.9% |
| Ex. 10 | 7.9 | 9.5 | 32.4 | 26.1 | 10.8% |
| Ex. 11 | 9.3 | 9.6 | 32.3 | 23.3 | 16.2% |
| Ex. 12 | 8.3 | 9.5 | 30.1 | 22.5 | 14.5% |
| Ex. 13 | 9.6 | 9.4 | 32.9 | 23.2 | 17.3% |
| Ex. 14 | 9.3 | 9.6 | 29.7 | 22.6 | 13.6% |
| Ex. 15 | 8.9 | 9.5 | 28.4 | 22.9 | 10.7% |
| Ex. 16 | 8.4 | 9.5 | 30.5 | 22.7 | 14.7% |
| Ex. 17 | 8.3 | 9.6 | 31.9 | 23.5 | 15.2% |
| Ex. 18 | 8.2 | 9.3 | 30.7 | 22.4 | 15.6% |
| Ex. 19 | 7.9 | 9.1 | 30.3 | 21.9 | 16.1% |
| Comp. Ex. 1 | 8.7 | 9.3 | 31.8 | 22.7 | 16.7% |
| Comp. Ex. 2 | 8.8 | 9.4 | 32.0 | 23.1 | 16.2% |
| Comp. Ex. 3 | 8.4 | 9.0 | 28.8 | 19.5 | 19.3% |
| Comp. Ex. 4 | 8.3 | 9.1 | 35.1 | 22.5 | 21.9% |
| Comp. Ex. 5 | 8.1 | 9.4 | 34.8 | 29.5 | 8.2% |
| Comp. Ex. 6 | 8.2 | 9.4 | 37.9 | 30.6 | 10.7% |
| Comp. Ex. 7 | 8.9 | 9.2 | 29.7 | 19.8 | 20.0% |
| Comp. Ex. 8 | 8.5 | 9.3 | 33.3 | 27.9 | 8.8% |

—Image Formation—

Under environmental conditions of 23° C.±0.5° C. and 50±5% RH, an image forming apparatus (IPSIO GXE-5500 available from Ricoh Co., Ltd.) was set such that a driving voltage for a piezo element was varied to discharge the inks in a uniform amount to attach the inks in a uniform amount over OK TOP COAT+(with a basis weight of 104.7 g/m$^2$) available from Oji Paper Co., Ltd., which was a recording medium.

Next, various properties of Examples 1 to 19 and Comparative Examples 1 to 8 were evaluated in the manners described below. The results are presented in Table 8.

<Image Density>

A chart generated with WORD 2000 available from Microsoft Corporation and including a 64-point character "black square" was output over MYPAPER (available from Ricoh Co., Ltd.), which was a recording medium. The portion where the "black square" character was printed in the printed surface was subjected to colorimetry with a spectrodensitometer (X-RITE 939 available from X-Rite Inc.) and judged according to evaluation criteria described below. A printing mode used was a "plain paper-standard or quick" mode modified to "without chromatic compensation" by user setting for plain paper made through a driver provided as an attachment to the printer.

Note that "black square" is a character (mark) representing a solidly blackened square, but there is no choice but to use the representation "black square" because the mark cannot be used.

[Evaluation Criteria]

A: Black: 1.25 or higher, Yellow: 0.8 or higher, Magenta: 1.00 or higher, and Cyan: 1.05 or higher B: Black: 1.20 or higher but lower than 1.25, Yellow: 0.75 or higher but lower than 0.8, Magenta: 0.95 or higher but lower than 1.00, and Cyan: 1.0 or higher but lower than 1.05

C: Black: 1.15 or higher but lower than 1.20, Yellow: 0.70 or higher but lower than 0.75, Magenta: 0.90 or higher but lower than 0.95, and Cyan: 0.95 or higher but lower than 1.00

D: Black: lower than 1.15, Yellow: lower than 0.70, Magenta: lower than 0.90, and Cyan: lower than 0.95

<Beading>

With the recording medium changed to OK TOP COAT+ (with a basis weight of 104.7 g/m$^2$) available from Oji Paper Co., Ltd., and with a "gloss paper-beautiful" mode modified to "without chromatic compensation" through the printer-attached driver used as the printing mode, a solid image was printed in the same manner as in the evaluation of image density. Density unevenness (beading) in the solid image was visually observed and judged according to evaluation criteria described below.

[Evaluation Criteria]

A: No density unevenness was present at all.
B: Slight density unevenness was present.
C: Considerable density unevenness was present.
D: Severe density unevenness was present.

Because it was very hard to distinguish beading in a black solid image, the black solid image was observed with an optical microscope at a 40 times magnification.

<Discharging Stability-1: Intermittent Discharging Evaluation>

A chart generated with WORD 2000 available from Microsoft Corporation and including a solid image of each color occupying 5%/color of the area of a A4-size sheet was output over 200 sheets of MYPAPER (available from Ricoh Co., Ltd.) continuously. Any non-smoothness in discharging from each nozzle after the outputting was evaluated according to criteria described below. A printing mode used was a "plain paper-standard or quick" mode modified to "without chromatic compensation" by user setting for plain paper made through the printer-attached driver.

[Evaluation Criteria]
A: There was no non-smoothness in discharging.
B: There was slight non-smoothness in discharging.
C: There was non-smoothness in discharging or there was a portion that failed to discharge.

<Discharging Stability-2: Nozzle Plate's Ink Repelling Time>

Under environmental conditions in which a temperature was 23±5° C. and a relative humidity was 50%±5% RH, each ink (50 g) was poured into a 50 mL beaker, and a nozzle plate of a head used in an image forming apparatus (IPSIO GXE-5500 available from Ricoh Co., Ltd.) was taken out, pinched with a pair of tweezers, immersed in the ink at a speed of 315 mm/min, and taken out at the same speed. A time taken for the ink to be repelled from an ink-repellent layer over the nozzle plate (i.e., an ink ebbing time) was measured and evaluated according to criteria described below. Note that the ink-repellent layer was OPTOOL DSX available from Daikin Industries, Ltd.

[Evaluation Criteria]
A: The ink repelling time was shorter than 10 seconds.
B: The ink repelling time was longer than or equal to 10 seconds but shorter than 30 seconds.
C: The ink repelling time was longer than or equal to 30 seconds but shorter than 60 seconds.
D: The ink repelling time was longer than or equal to 60 seconds.

When the ink repelling time is long, nozzle clogging is likely to occur in a continuous discharging evaluation because the nozzle plate is likely to be wetted with the ink.

<Gamut Cover Rate>

A chart generated with WORD 2000 available from Microsoft Corporation and including 10 or more gradients of patches of 6 or more hues including C, M, Y, R, G, and B with an area rate in a range of from 0% through 100%, and 8 or more gradients of patches of C, M, Y, R, G, and B with an area rate of 100% and additionally K in a range of from 0% through 100% was output over LUMIART GLOSS 130GSM (available from STORA ENSO Co., Ltd.), which was a recording medium, to measure a L*a*b* color space with a spectrodensitometer (X-RITE 939 available from X-Rite Inc.).

Six points projected over an a*b* plane for C, M, Y, R G, and B at each luminosity level L* were linked together by straight lines as a color gamut area. An area of a region over which the color gamut area of an evaluated color and the color gamut area of a target color overlapped with each other was integrated in the luminosity direction (as an enclosed volume). A ratio of the obtained value of integral to a color gamut volume of the target color (enclosed volume/color gamut volume of the target color), i.e., a gamut cover rate, was calculated. A gamut cover rate of higher than or equal to 90% is a pass level.

The target color used was a color reproduction area in the L*a*b* color space defined in 'Japan Color 2011 for Sheet-fed Offset based on ISO' (abbreviated as: Japan Color 2011 coat paper)'.

TABLE 8

| | Image density | Beading | Discharging stability-1 Intermittent discharging evaluation | Discharging stability-2 Ink repelling time |
|---|---|---|---|---|
| Ex. 1 | B | B | A | A |
| Ex. 2 | A | A | A | A |
| Ex. 3 | A | A | A | A |
| Ex. 4 | A | A | A | A |
| Ex. 5 | B | B | A | A |
| Ex. 6 | A | A | A | B |

TABLE 8-continued

| | Image density | Beading | Discharging stability-1 Intermittent discharging evaluation | Discharging stability-2 Ink repelling time |
|---|---|---|---|---|
| Ex. 7 | A | A | A | A |
| Ex. 8 | A | A | A | A |
| Ex. 9 | A | A | A | B |
| Ex. 10 | A | A | A | A |
| Ex. 11 | B | B | B | A |
| Ex. 12 | A | B | B | A |
| Ex. 13 | A | B | B | A |
| Ex. 14 | A | A | B | A |
| Ex. 15 | A | A | B | B |
| Ex. 16 | A | A | A | A |
| Ex. 17 | A | A | A | B |
| Ex. 18 | A | A | A | A |
| Ex. 19 | A | A | A | B |
| Comp. Ex. 1 | B | C | B | A |
| Comp. Ex. 2 | B | D | B | A |
| Comp. Ex. 3 | A | A | B | D |
| Comp. Ex. 4 | B | C | B | D |
| Comp. Ex. 5 | B | D | B | A |
| Comp. Ex. 6 | C | D | B | A |
| Comp. Ex. 7 | A | B | B | D |
| Comp. Ex. 8 | B | D | B | B |

TABLE 9

| | Ink | Gamut cover rate [%] |
|---|---|---|
| Ink set 1 | Ink of Ex. 1 | 92 |
| | Ink of Ex. 7 | |
| | Ink of Ex. 8 | |
| | Ink of Ex. 9 | |
| Ink set 2 | Ink of Ex. 4 | 94 |
| | Ink of Ex. 7 | |
| | Ink of Ex. 8 | |
| | Ink of Ex. 9 | |
| Ink set 3 | Ink of Ex. 6 | 97 |
| | Ink of Ex. 7 | |
| | Ink of Ex. 8 | |
| | Ink of Ex. 9 | |
| Ink set 4 | Ink of Ex. 6 | 95 |
| | Ink of Ex. 7 | |
| | Ink of Ex. 8 | |
| | Ink of Ex. 10 | |
| Ink set 5 | Ink of Ex. 12 | 93 |
| | Ink of Ex. 13 | |
| | Ink of Ex. 14 | |
| | Ink of Ex. 15 | |
| Ink set 6 | Ink of Ex. 16 | 102 |
| | Ink of Ex. 17 | |
| | Ink of Ex. 18 | |
| | Ink of Ex. 19 | |
| Comparative ink set 1 | Ink of Comp. Ex. 1 | 87 |
| | Ink of Comp. Ex. 3 | |
| | Ink of Comp. Ex. 7 | |
| | Ink of Comp. Ex. 8 | |
| Comparative ink set 2 | Ink of Comp. Ex. 2 | 85 |
| | Ink of Comp. Ex. 6 | |
| | Ink of Comp. Ex. 7 | |
| | Ink of Comp. Ex. 8 | |

Aspects of the present invention are as follows, for example.

<1> An ink containing:

a colorant;

an organic solvent; and water, wherein the ink contains as the organic solvent, at least one kind of an organic solvent having a solubility parameter of greater than or equal to 9 but less than 11.8, wherein a content of the organic solvent having a solubility parameter of greater than or equal to 9 but less than 11.8 is greater than or equal to 20% by mass of a total amount of the ink, wherein a dynamic surface tension A of the ink at 25° C. at a surface lifetime, measured by a maximum foaming pressure method, of 15 msec is less than or equal to 34.0 mN/m, and wherein the dynamic surface tension A and a static surface tension B of the ink at 25° C. satisfy a formula of $10.0\% \leq [(A-B)/(A+B)] \times 100 \leq 19.0\%$.

<2> The ink according to <1>, wherein the dynamic surface tension A of the ink at 25° C. at a surface lifetime, measured by a maximum foaming pressure method, of 15 msec is less than or equal to 30.0 mN/m, and wherein the dynamic surface tension A and the static surface tension B of the ink at 25° C. satisfy a formula of $12.0\% \leq [(A-B)/(A+B)] \times 100 \leq 17.0\%$.

<3> The ink according to <1> or <2>, wherein the static surface tension B of the ink at 25° C. is greater than or equal to 20.0 mN/m but less than or equal to 30.0 mN/m.

<4> The ink according to any one of <1> to <3>, wherein the organic solvent having a solubility parameter of greater than or equal to 9 but less than 11.8 is at least one kind selected from the group consisting of compounds represented by general formulae (I) and (II) below,

[General formula (I)]

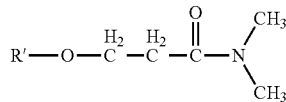

where in the general formula (I), R' represents an alkyl group containing 4 through 6 carbon atoms,

[General formula (II)]

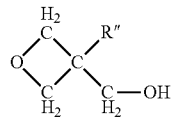

where in the general formula (II), R" represents an alkyl group containing 1 or 2 carbon atoms.

<5> The ink according to any one of <1> to <4>, wherein the organic solvent is free of a polyvalent alcohol having an equilibrium water content of greater than or equal to 30% at a temperature of 23° C. and a relative humidity of 80%.

<6> The ink according to any one of <1> to <5>, further containing a surfactant.

<7> The ink according to <6>, wherein the surfactant contains a polyether-modified siloxane compound.

<8> The ink according to any one of <1> to <7>, wherein the polyether-modified siloxane compound is at least one kind selected from the group consisting of compounds represented by general formulae (III) to (VI) below,

[General formula (III)]

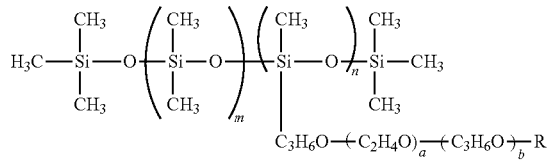

where in the general formula (III), m represents an integer in a range of from 0 through 23, n represents an integer in a range of from 1 through 10, a represents an integer in a range of from 1 through 23, b represents an integer in a range of from 0 through 23, and R represents a hydrogen atom or an alkyl group containing 1 through 4 carbon atoms,

[General formula (IV)]

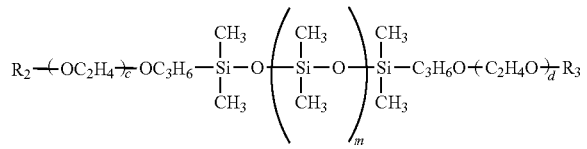

where in the general formula (IV), m represents an integer in a range of from 1 through 8, c and d represent an integer in a range of from 1 through 10, and $R_2$ and $R_3$ represent a hydrogen atom or an alkyl group containing 1 through 4 carbon atoms,

[General formula (V)]

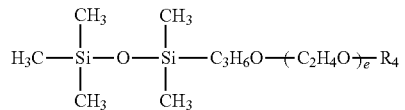

where in the general formula (V), e represents an integer in a range of from 1 through 8 and $R_4$ represents a hydrogen atom or an alkyl group containing 1 through 4 carbon atoms,

[General formula (VI)]

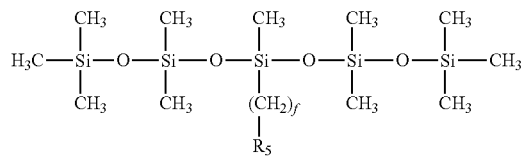

where in the general formula (VI), f represents an integer in a range of from 1 through 8 and $R_5$ represents a polyether group represented by general formula (A) below,

[General formula (A)]

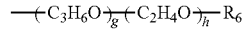

where in the general formula (A), g represents an integer in a range of from 0 through 23, h represents an integer in a range of from 0 through 23, where g and h do not take 0 at a same time, and $R_6$ represents a hydrogen atom or an alkyl group containing 1 through 4 carbon atoms.

<9> The ink according to <7> or <8>,
wherein a content of the polyether-modified siloxane compound in the ink is greater than or equal to 0.001% by mass but less than or equal to 5% by mass.
<10> The ink according to any one of <1> to <9>,
wherein the colorant is a water-dispersible pigment.
<11> The ink according to <10>,
wherein the water-dispersible pigment contains a hydrophilic functional group on a surface, and the hydrophilic functional group is a quaternary ammonium salt.
<12> The ink according to <10>,
wherein the water-dispersible pigment is a reformed pigment reformed with at least one of a geminal bisphosphonic acid group and a geminal bisphosphonic acid salt group.
<13> The ink according to any one of <10> to <12>,
wherein the water-dispersible pigment is at least one kind selected from the group consisting of black pigments, cyan pigments, magenta pigments, and yellow pigments.
<14> The ink according to any one of <1> to <13>,
wherein the colorant is one selected from the group consisting of carbon black pigments, phthalocyanine pigments, quinacridone pigments, monoazo pigments, and disazo pigments, and
wherein a gamut cover rate reproduced by the ink is greater than or equal to 90% of a gamut cover rate defined in Japan Color 2011 coat paper.
<15> The ink according to any one of <1> to <14>, further containing a water-dispersible resin.
<16> The ink according to any one of <1> to <15>, wherein the ink is intended for either inkjet recording or spray painting.
<17> An ink container including:
the ink according to any one of <1> to <16>; and a container storing the ink.
<18> An image forming method including
an ink flying step of applying at least one stimulus selected from the group consisting of heat, pressure, vibration, and light to the ink according to any one of <1> to <16> to fly the ink and record an image.
<19> An image forming apparatus including
an ink flying unit configured to apply at least one stimulus selected from the group consisting of heat, pressure, vibration, and light to the ink according to any one of <1> to <16> to fly the ink and record an image.
<20> An image formed matter including:
a recording medium; and
an image formed over the recording medium with the ink according to any one of <1> to <16>.
<21> The ink according to any one of <12> to <16>, wherein the reformed pigment is modified with at least one group selected from the group consisting of groups represented by structural formulae (i), (ii), (iii), and (iv) below,

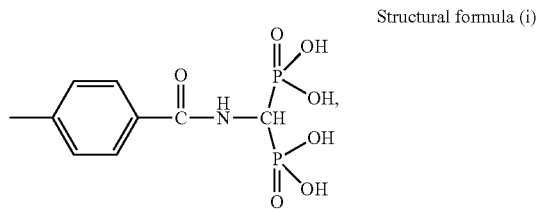

Structural formula (i)

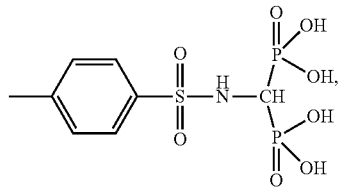

Structural formula (ii)

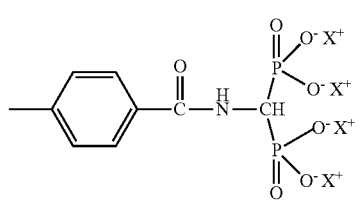

Structural formula (iii)

where in the structural formula (iii), $X^+$ represents any one of $Li^+$, $K^+$, $Na^+$, $NH_4^+$, $N(CH_3)_4^+$, $N(C_2H_5)_4^+$, $N(C_3H_7)_4^+$, and $N(C_4H_9)_4^+$,

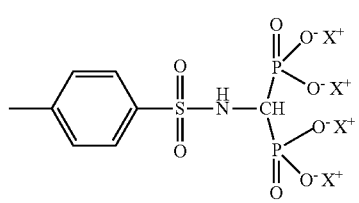

Structural formula (iv)

where in the structural formula (iv), $X^+$ represents any one of $Li^+$, $K^+$, $Na^+$, $NH_4^+$, $N(CH_3)_4^+$, $N(C_2H_5)_4^+$, $N(C_3H_7)_4^+$, and $N(C_4H_9)_4^+$.
<22> The ink according to any one of <10> to <16>,
wherein the water-dispersible resin is either acrylic-silicone resin particles or fluorine-based resin particles.

The ink according to any one of <1> to <16>, <21>, and <22>, the ink container according to <17>, the image forming method according to <18>, the image forming apparatus according to <19>, and the image formed matter according to <20> can solve the various related problems described above and achieve the object of the present invention.

What is claimed is:
1. An ink, comprising:
a colorant;
an organic solvent;
water; and
a surfactant comprising at least one polyether-modified siloxane compound selected from the group consisting of compounds of formulae (III), (IV), (V), and (VI),

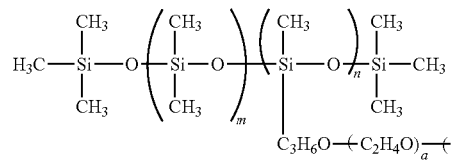

formula (III)

where in the formula (III), m represents an integer in a range of from 0 through 23, n represents an integer in a range of from 1 through 10, a represents an integer in a range of from 1 through 23, b represents an integer in a range of from 0 through 23, and R represents a hydrogen atom or an alkyl group that comprises 1 through 4 carbon atoms, formula (IV)

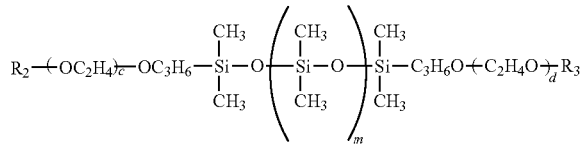

where in the formula (IV), m represents an integer in a range of from 1 through 8, c and d represent an integer in a range of from 1 through 10, and $R_2$ and $R_3$ represent a hydrogen atom or an alkyl group that comprises 1 through 4 carbon atoms, formula (V)

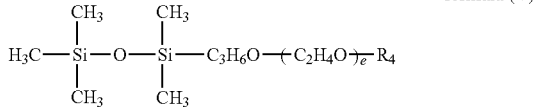

where in the formula (V), e represents an integer in a range of from 1 through 8 and $R_4$ represents a hydrogen atom or an alkyl group that comprises 1 through 4 carbon atoms, formula (VI)

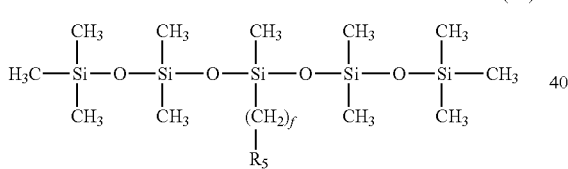

where in the formula (VI), f represents an integer in a range of from 1 through 8 and $R_5$ represents a polyether group represented by the formula (A), formula (A)

where in the general formula (A), g represents an integer in a range of from 0 through 23, h represents an integer in a range of from 0 through 23, where g and h do not take 0 at a same time, and $R_6$ represents a hydrogen atom or an alkyl group that comprises 1 through 4 carbon atoms, wherein the organic solvent comprises at least one organic solvent having a solubility parameter of greater than or equal to 9 but less than 11.8, wherein a content of the organic solvent having a solubility parameter of greater than or equal to 9 but less than 11.8 is greater than or equal to 20% by mass of a total amount of the ink, wherein a dynamic surface tension A of the ink at 25° C. at a surface lifetime, measured by a maximum foaming pressure method, of 15 msec is less than or equal to 34.0 mN/m, and wherein the dynamic surface tension A and a static surface tension B of the ink at 25° C. satisfy a formula of $10.0\% \leq [(A-B)/(A+B)] \times 100 \leq 19.0\%$.

2. The ink according to claim 1,
wherein the dynamic surface tension A of the ink at 25° C. at a surface lifetime, measured by a maximum foaming pressure method, of 15 msec is less than or equal to 30.0 mN/m, and
wherein the dynamic surface tension A and the static surface tension B of the ink at 25° C. satisfy a formula of $12.0\% \leq [(A-B)/(A+B)] \times 100 \leq 17.0\%$.

3. The ink according to claim 1,
wherein the static surface tension B of the ink at 25° C. is greater than or equal to 20.0 mN/m but less than or equal to 30.0 mN/m.

4. The ink according to claim 1,
wherein the organic solvent having a solubility parameter of greater than or equal to 9 but less than 11.8 comprises at least one compound selected from the group consisting of compounds of formulae (I) and (II), formula (I)

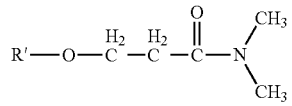

where in the formula (I), R' represents an alkyl group that comprises 4 through 6 carbon atoms, formula (II)

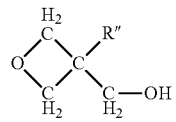

where in the formula (II), R" represents an alkyl group that comprises 1 or 2 carbon atoms.

5. The ink according to claim 1,
wherein the organic solvent is free of a polyvalent alcohol having an equilibrium water content of greater than or equal to 30% at a temperature of 23° C. and a relative humidity of 80%.

6. The ink according to claim 1,
wherein the surfactant comprises a polyether-modified siloxane compound of the formula (III).

7. The ink according to claim 6,
wherein the polyether-modified siloxane compound of the formula (III) comprises a compound of formula (VI), (VII), (VIII), (IX), (X), (XI), (XII), or (XIII), formula (VI)

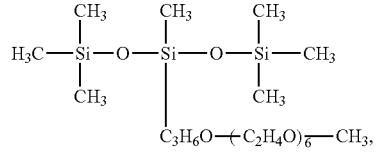

-continued

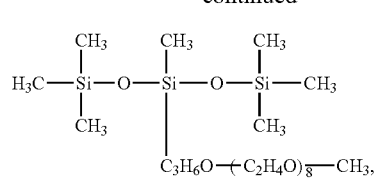

formula (VII)

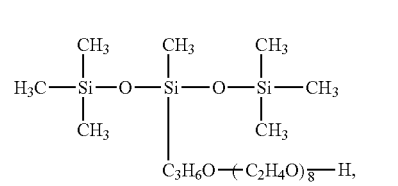

formula (VIII)

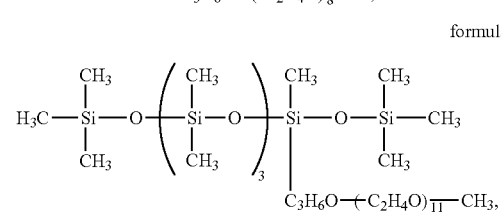

formula (IX)

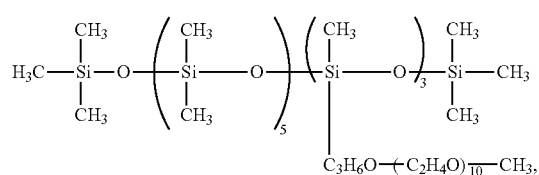

formula (X)

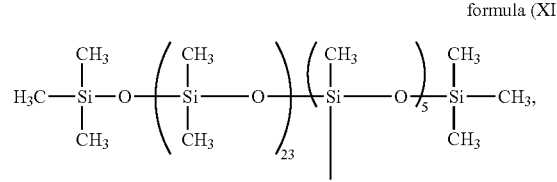

formula (XI)

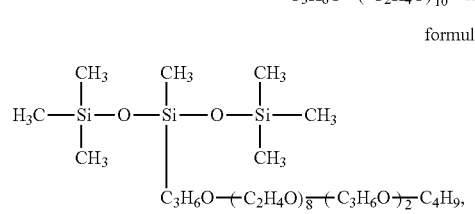

formula (XII)

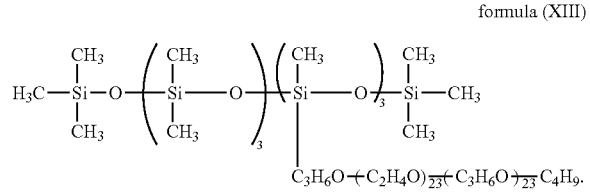

formula (XIII)

8. The ink according to claim 1,
wherein a content of the polyether-modified siloxane compound in the ink is greater than or equal to 0.001% by mass but less than or equal to 5% by mass.

9. The ink according to claim 1,
wherein the colorant comprises a water-dispersible pigment.

10. The ink according to claim 9,
wherein the water-dispersible pigment comprises a hydrophilic functional group on a surface, and the hydrophilic functional group comprises a quaternary ammonium salt.

11. The ink according to claim 9,
wherein the water-dispersible pigment comprises a reformed pigment reformed with at least one of a geminal bisphosphonic acid group and a geminal bisphosphonic acid salt group.

12. The ink according to claim 9,
wherein the water-dispersible pigment comprises at least one kind selected from the group consisting of black pigments, cyan pigments, magenta pigments, and yellow pigments.

13. The ink according to claim 1,
wherein the colorant comprises one selected from the group consisting of carbon black pigments, phthalocyanine pigments, quinacridone pigments, monoazo pigments, and disazo pigments, and
wherein a gamut cover rate reproduced by the ink is greater than or equal to 90% of a gamut cover rate defined in Japan Color 2011 coat paper.

14. The ink according to claim 1, further comprising a water-dispersible resin.

15. The ink according to claim 1,
wherein the ink is intended for either inkjet recording or spray painting.

16. An ink container, comprising:
the ink according to claim 1; and
a container storing the ink.

17. An image forming method, comprising:
applying at least one stimulus selected from the group consisting of heat, pressure, vibration, and light to the ink according to claim 1 to fly the ink and record an image.

18. An image forming apparatus, comprising:
an ink flying unit configured to apply at least one stimulus selected from the group consisting of heat, pressure, vibration, and light to the ink according to claim 1 to fly the ink and record an image.

19. An image formed matter comprising:
a recording medium; and
an image formed over the recording medium with the ink according to claim 1.

20. The ink according to claim 1,
wherein the water-dispersible pigment comprises a hydrophilic functional group on a surface.

* * * * *